(12) United States Patent
Lee et al.

(10) Patent No.: US 11,236,186 B2
(45) Date of Patent: Feb. 1, 2022

(54) TRANSITION METAL COMPOUND FOR OLEFIN POLYMERIZATION CATALYST, OLEFIN POLYMERIZATION CATALYST COMPRISING SAME, AND POLYOLEFIN POLYMERIZED USING SAME

(71) Applicant: HANWHA CHEMICAL CORPORATION, Seoul (KR)

(72) Inventors: Hyun Seung Lee, Daejeon (KR); Na Young Park, Daejeon (KR); Seong Yeon Park, Seoul (KR); Hee Ju Yang, Daejeon (KR); Sung Cheol Yoon, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 8 days.

(21) Appl. No.: 16/466,820

(22) PCT Filed: Dec. 6, 2017

(86) PCT No.: PCT/KR2017/014258
§ 371 (c)(1),
(2) Date: Jun. 5, 2019

(87) PCT Pub. No.: WO2018/106028
PCT Pub. Date: Jun. 14, 2018

(65) Prior Publication Data
US 2019/0309110 A1    Oct. 10, 2019

(30) Foreign Application Priority Data
Dec. 6, 2016 (KR) .................. 10-2016-0164937

(51) Int. Cl.
C08F 4/6592 (2006.01)
C08F 210/16 (2006.01)
C07F 17/00 (2006.01)
C07F 7/28 (2006.01)
C08F 4/14 (2006.01)
C08F 4/642 (2006.01)
C08F 4/646 (2006.01)
C08F 2/38 (2006.01)
C08F 210/02 (2006.01)

(52) U.S. Cl.
CPC .............. *C08F 210/16* (2013.01); *C07F 7/28* (2013.01); *C08F 2/38* (2013.01); *C08F 4/14* (2013.01); *C08F 4/6428* (2013.01); *C08F 4/6465* (2013.01); *C08F 4/6592* (2013.01); *C08F 210/02* (2013.01); *C08F 2420/01* (2013.01)

(58) Field of Classification Search
CPC ....... C07F 17/00; C08F 4/6592; C08F 210/16
See application file for complete search history.

(56) References Cited

U.S. PATENT DOCUMENTS

| | | |
|---|---|---|
| 5,965,756 A | 10/1999 | McAdon et al. |
| 6,369,176 B1 | 4/2002 | Laughner et al. |
| 2004/0214953 A1 | 10/2004 | Yamada et al. |
| 2014/0213734 A1 | 7/2014 | Jiang |
| 2016/0244535 A1 | 8/2016 | Canich et al. |

FOREIGN PATENT DOCUMENTS

| | | |
|---|---|---|
| JP | 2003507541 A | 2/2003 |
| JP | 2011231260 A | 11/2011 |
| WO | 9849212 A1 | 11/1998 |
| WO | 2005058916 A2 | 6/2005 |

OTHER PUBLICATIONS

Extended European Search Report for European Application No. 17 878 458.3, dated Jul. 29, 2020, 6 pages.
Xu et al., "Ethylene Copolymerization with 1-Octene Using a 2-Methylbenz[e]indenyl-Based ansa-Monocyclopentadienylamido Complex and Methylaluminoxanes Catalyst," Macromolecules 1998, 31, 4724-4729.
International Search Report issued in PCT Application No. PCT/KR2017/014258 dated Feb. 22, 2018, 7 pages.
Japanese Notice of Reasons for Refusal issued in Japanese Patent Application No. 2019-530122, dated Oct. 26, 2021, with translation, 12 pages.

*Primary Examiner* — Caixia Lu
(74) *Attorney, Agent, or Firm* — RatnerPrestia

(57) ABSTRACT

Provided are a transition metal compound for an olefin polymerization catalyst, an olefin polymerization catalyst containing the transition metal compound, and a polyolefin prepared using the olefin polymerization catalyst for polymerization thereof, wherein the transition metal compound is represented by Chemical Formula A1 or Chemical Formula B1.

4 Claims, 3 Drawing Sheets

TRANSITION METAL COMPOUND FOR OLEFIN POLYMERIZATION CATALYST, OLEFIN POLYMERIZATION CATALYST COMPRISING SAME, AND POLYOLEFIN POLYMERIZED USING SAME

TECHNICAL FIELD

The present invention relates to a transition metal compound for an olefin polymerization catalyst, an olefin polymerization catalyst containing the transition metal compound, and a polyolefin prepared using the olefin polymerization catalyst for polymerization thereof.

BACKGROUND ART

A metallocene catalyst, which is a type of catalyst used for polymerizing olefins, is based on a compound in which a ligand such as a cyclopentadienyl group, an indenyl group, a cycloheptadienyl group, or the like is linked to a transition metal compound or a transition metal halide compound through a coordinate covalent bond, and the basic form thereof is a sandwich structure.

The metallocene catalyst is a single-site catalyst containing the above-described metallocene compound and a co-catalyst such as methylaluminoxane or the like. The use of the metallocene catalyst for polymerization results in a polymer having a narrow molecular weight distribution and a uniform comonomer distribution, and the metallocene catalyst exhibits higher copolymerization activity than a Ziegler-Natta catalyst.

However, since there are still many challenges in using the catalyst commercially, it is required to develop a catalyst having high activity and being highly capable of achieving copolymerization even at a high temperature of 100° C. or more and an economically feasible production technique.

DISCLOSURE OF THE INVENTION

Technical Problem

One aspect of the present invention is to provide: a transition metal compound for an olefin polymerization catalyst; an olefin polymerization catalyst having high activity and being highly capable of achieving copolymerization even at a high temperature by containing the transition metal compound; and a polyolefin prepared using the olefin polymerization catalyst for polymerization thereof and thus having excellent physical properties such as low density, high molecular weight, and the like.

Another aspect of the present invention is to provide a mixture of transition metal compounds that can lead to lower production costs for a given level of olefin polymerization performance.

However, the technical scope of the present invention is not limited to the above-described objectives, and other unmentioned objectives can be clearly understood by those skilled in the art from the following description.

Technical Solution

According to an embodiment of the present invention, a transition metal compound for an olefin polymerization catalyst, the transition metal compound represented by the following Chemical Formula A1 or Chemical Formula B1.

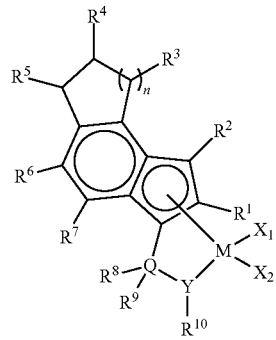

<Chemical Formula A1>

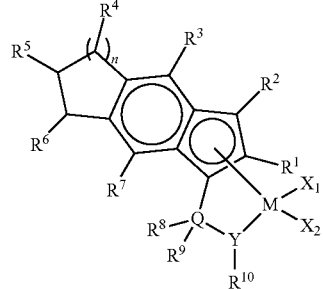

<Chemical Formula B1>

(In each independent Chemical Formula A1 and Chemical Formula B1, n is 1 to 4, M is titanium (Ti), zirconium (Zr), or hafnium (Hf), Q is silicon (Si) or carbon (C), Y is nitrogen (N), phosphorus (P), oxygen (O), or sulfur (S), X1 and X2 are each independently a halogen, a C1-20 alkyl, a C2-20 alkenyl, a C2-20 alkynyl, a C6-20 aryl, a C1-20 alkyl C6-20 aryl, a C6-20 aryl C1-20 alkyl, a C1-20 alkylamido, a C6-20 arylamido, or a C1-20 alkylidene, and R1 to R10 are each independently a hydrogen atom, a substituted or unsubstituted C1-20 alkyl, a substituted or unsubstituted C2-20 alkenyl, a substituted or unsubstituted C6-20 aryl, a substituted or unsubstituted C1-20 alkyl C6-20 aryl, a substituted or unsubstituted C6-20 aryl C1-20 alkyl, a substituted or unsubstituted C1-20 heteroalkyl, a substituted or unsubstituted C3-20 heteroaryl, or a substituted or unsubstituted C1-20 silyl.)

The Chemical Formula A1 may be the following Chemical Formula A2:

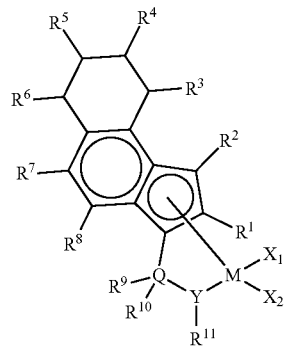

<Chemical Formula A2>

(In Chemical Formula A2, M is Ti, Q is Si, Y is N, $X_1$ and $X_2$ are each independently a halogen or a $C_{1-20}$ alkyl, $R^1$ and $R^9$ to $R^{11}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ are each a hydrogen atom.)

The Chemical Formula A1 may be one of the following Chemical Formulas a-1 to a-24:

<Chemical Formula a-1>

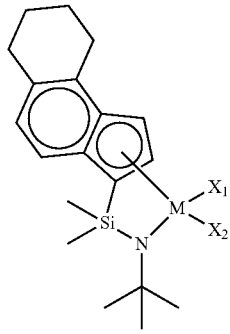

<Chemical Formula a-2>

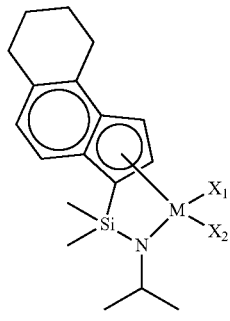

<Chemical Formula a-3>

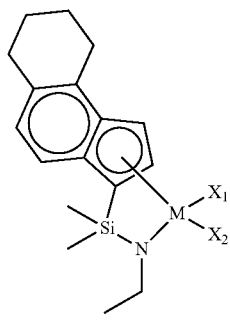

<Chemical Formula a-4>

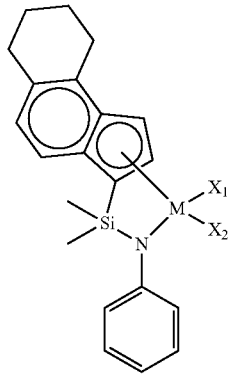

<Chemical Formula a-5>

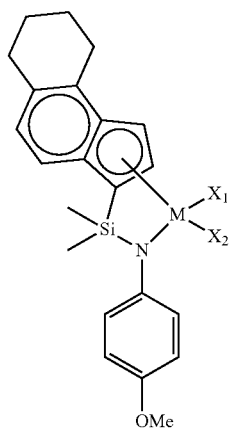

<Chemical Formula a-6>

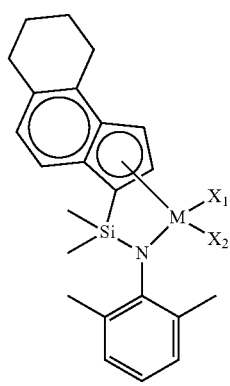

<Chemical Formula a-7>

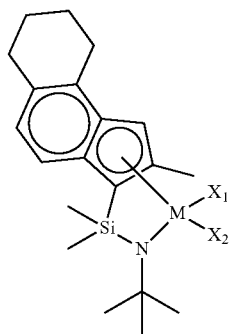

<Chemical Formula a-8>

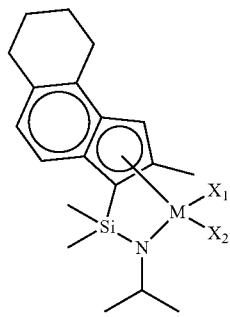

<Chemical Formula a-9>
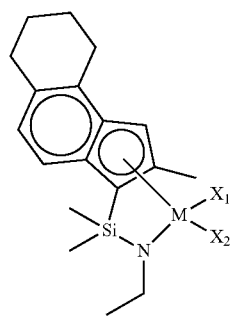
<Chemical Formula a-10>
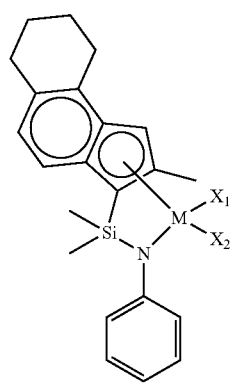
<Chemical Formula a-11>
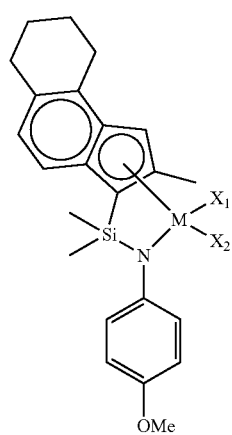
<Chemical Formula a-12>
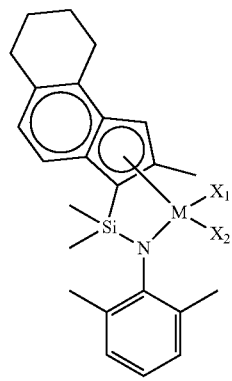
<Chemical Formula a-13>
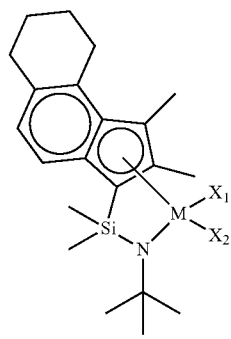
<Chemical Formula a-14>
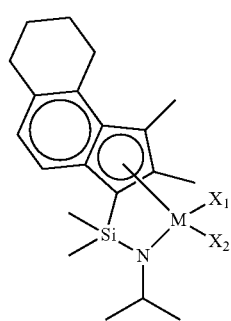
<Chemical Formula a-15>
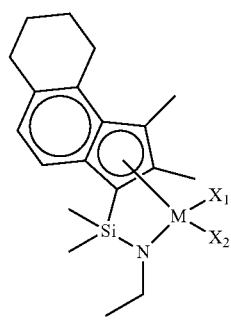
<Chemical Formula a-16>
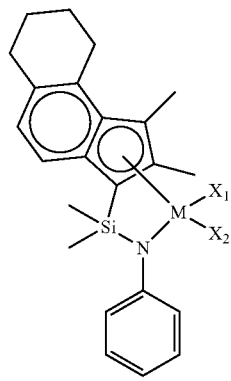

<Chemical Formula a-17>
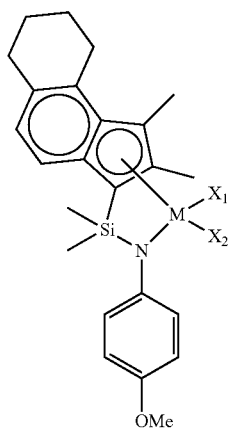
<Chemical Formula a-18>
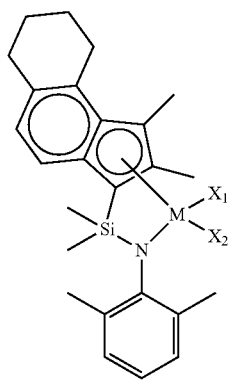
<Chemical Formula a-19>
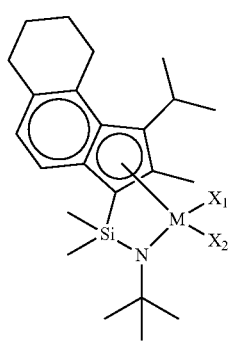
<Chemical Formula a-20>
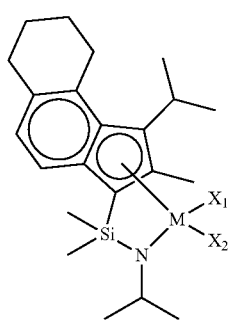
<Chemical Formula a-21>
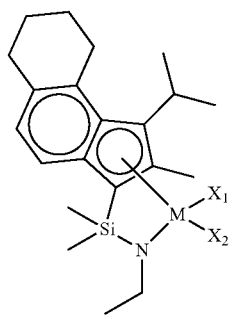
<Chemical Formula a-22>
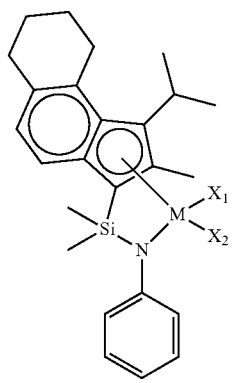
<Chemical Formula a-23>
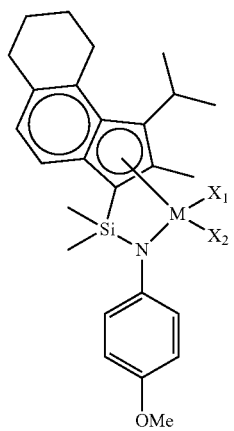
<Chemical Formula a-24>
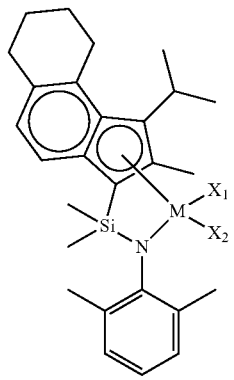
(In each independent Chemical Formula a-1 to Chemical Formula a-24, M is Ti, and $X_1$ and $X_2$ are each independently a halogen or a $C_{1-20}$ alkyl.)

The Chemical Formula B1 may be the following Chemical Formula B2:

<Chemical Formula B2>

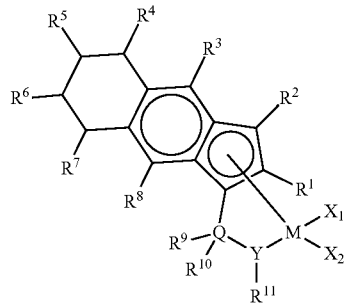

(In Chemical Formula B2, M is Ti, Q is Si, Y is N, $X_1$ and $X_2$ are each independently a halogen or a $C_{1-20}$ alkyl, $R^1$ and $R^9$ to $R^{11}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ are each a hydrogen atom.)

The Chemical Formula B1 may be one of the following Chemical Formulas b-1 to b-24:

<Chemical Formula b-1>

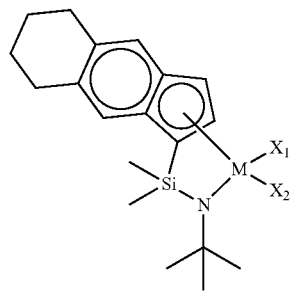

<Chemical Formula b-2>

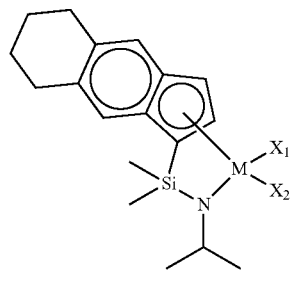

<Chemical Formula b-3>

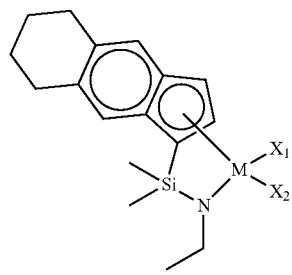

<Chemical Formula b-4>

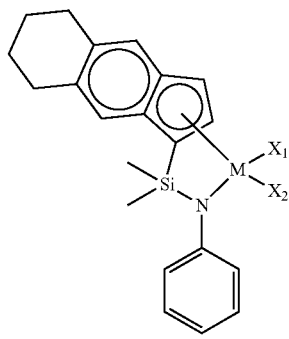

<Chemical Formula b-5>

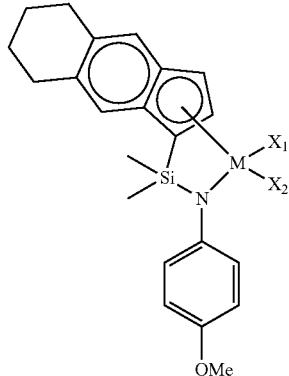

<Chemical Formula b-6>

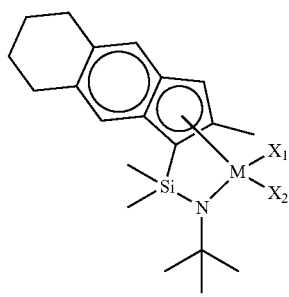

<Chemical Formula b-7>

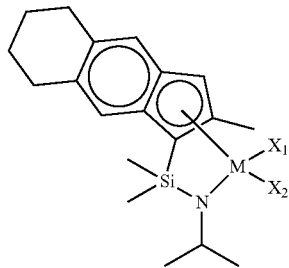

<Chemical Formula b-8>

<Chemical Formula b-9>
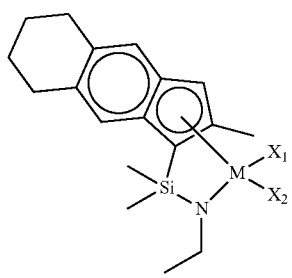
<Chemical Formula b-10>
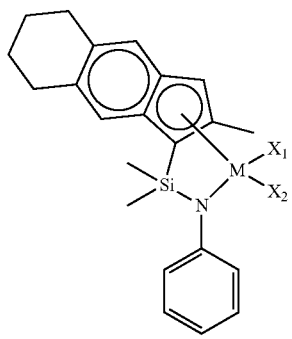
<Chemical Formula b-11>
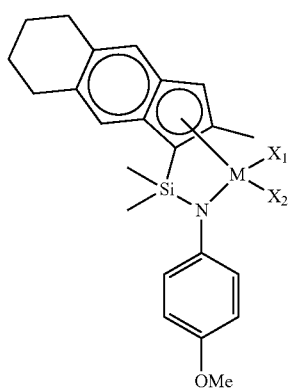
<Chemical Formula b-12>
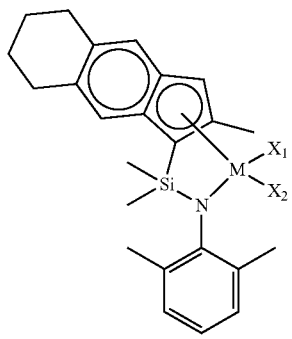
<Chemical Formula b-13>
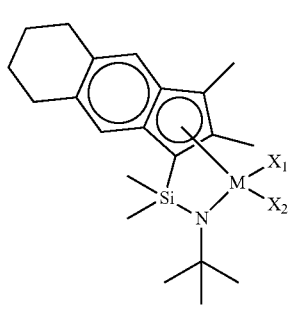
<Chemical Formula b-14>
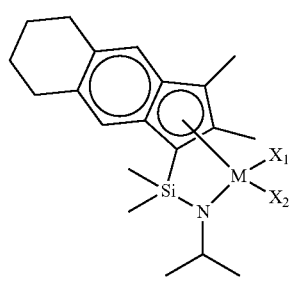
<Chemical Formula b-15>
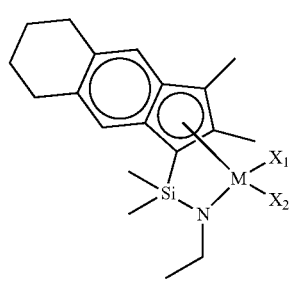
<Chemical Formula b-16>
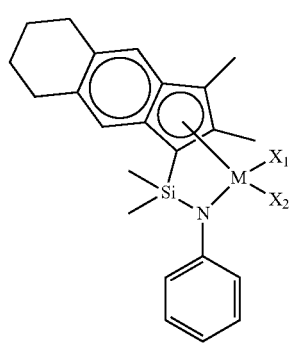
<Chemical Formula b-17>
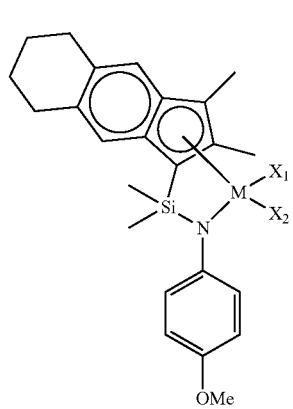
<Chemical Formula b-18>
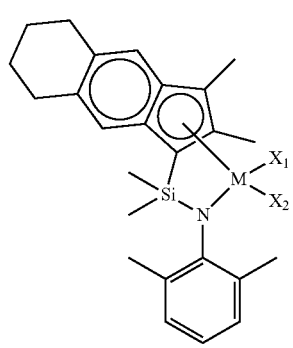

<Chemical Formula b-19>

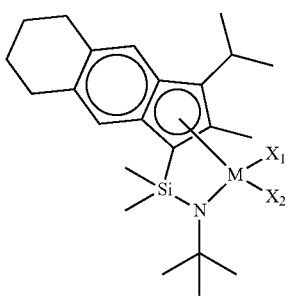

<Chemical Formula b-20>

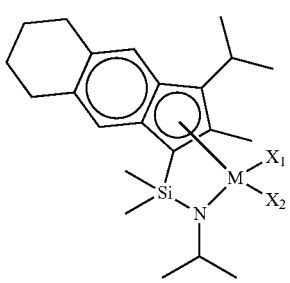

<Chemical Formula b-21>

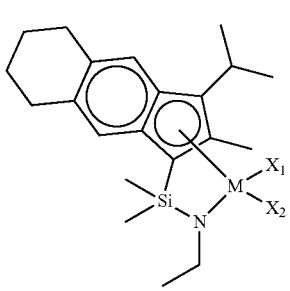

<Chemical Formula b-22>

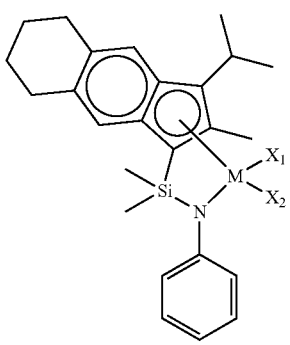

<Chemical Formula b-23>

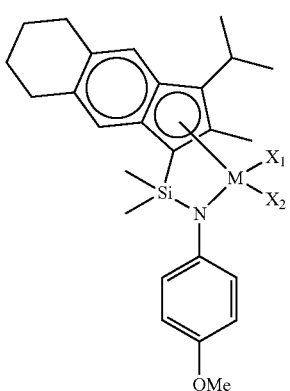

<Chemical Formula b-24>

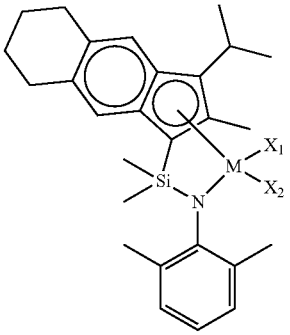

(In each independent Chemical Formula b-1 to Chemical Formula b-24, M is Ti, and $X_1$ and $X_2$ are each independently a halogen or a $C_{1-20}$ alkyl.)

According to another embodiment of the present invention, an olefin polymerization catalyst comprising: a main catalyst compound including one or more of a compound represented by the following Chemical Formula A1 and a compound represented by the following Chemical Formula B1; and a co-catalyst compound.

<Chemical Formula A1>

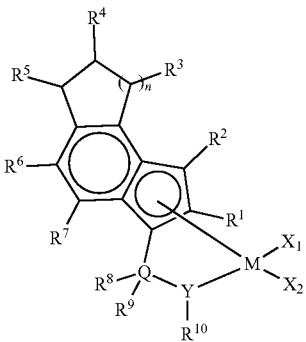

<Chemical Formula B1>

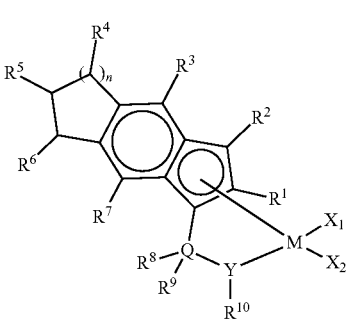

(In each independent Chemical Formula A1 and Chemical Formula B1, n is 1 to 4, M is Ti, Zr, or Hf, Q is Si or C, Y is N, P, O, or S, $X_1$ and $X_2$ are each independently a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido, or a $C_{1-20}$ alkylidene, and $R^1$ to $R^{10}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl.)

The Chemical Formula A1 may be the following Chemical Formula A2, and the Chemical Formula B1 may be the following Chemical Formula B2:

<Chemical Formula A2>

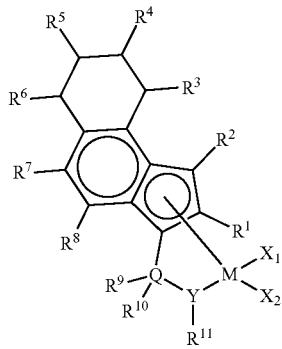

<Chemical Formula B2>

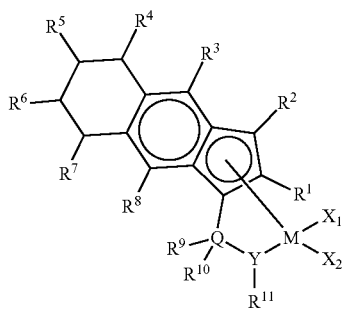

(In each independent Chemical Formula A2 and Chemical Formula B2; M is Ti, Q is Si, Y is N, $X_1$ and $X_2$ are each independently a halogen or a $C_{1-20}$ alkyl, $R^1$ and $R^9$ to $R^{11}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ are each a hydrogen atom.)

The co-catalyst compound may include one or more of a compound represented by the following Chemical Formula 1, a compound represented by the following Chemical Formula 2, and a compound represented by the following Chemical Formula 3:

<Chemical Formula 1>

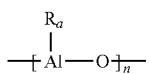

(In Chemical Formula 1, n is an integer of 2 or more, and $R_a$ is a hydrogen atom, a halogen radical, a $C_{1-20}$ hydrocarbyl radical, or a $C_{1-20}$ hydrocarbyl radical substituted with a halogen.)

<Chemical Formula 2>

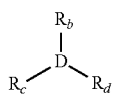

(In Chemical Formula 2, D is aluminum (Al) or boron (B), and $R_b$, $R_c$, and $R_d$ are each independently a halogen radical, a $C_{1-20}$ hydrocarbyl radical, or a $C_{1-20}$ hydrocarbyl radical substituted with a halogen.)

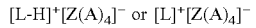

$[L-H]^+[Z(A)_4]^-$ or $[L]^+[Z(A)_4]^-$    <Chemical Formula 3>

(In Chemical Formula 3, L is a neutral or cationic Lewis base, $[L-H]^+$ and $[L]^+$ are a Brønsted acid, Z is a Group 13 element, and A is each independently a $C_{6-20}$ aryl or a $C_{1-20}$ alkyl in which one or more hydrogen atoms have been substituted with a halogen radical, a $C_{1-20}$ hydrocarbyl radical, a $C_{1-20}$ alkoxy radical, or a $C_{6-20}$ aryloxy radical or have not been substituted.)

The main catalyst compound may be a mixture of the compound of Chemical Formula A1 and the compound of Chemical Formula B1.

Which may contain, on a molar basis, more of the compound of Chemical. Formula A1 than it contains the compound of Chemical Formula B1.

The compound of Chemical Formula A1 and the compound of Chemical Formula B1 may be in a 2 to 4:1 molar ratio.

According to the other embodiment of the present invention, a polyolefin prepared through the polymerization of olefin-based monomers in the presence of the olefin polymerization catalyst.

The olefin-based monomer may include one or more selected from the group consisting of a $C_{2-20}$ α-olefin, a $C_{1-20}$ diolefin, a $C_{3-20}$ cycloolefin, and a $C_{3-20}$ cyclodiolefin.

The polyolefin of claim may have a molecular weight (Mw) of 250,000 or more.

The polyolefin of claim may have a density of 0.908 g/cm³ or less.

The polyolefin of claim may have a melting point of 98° C. or less.

The polyolefin of claim may have been prepared through the copolymerization of ethylene and 1-octene.

Other details of the embodiments of the present invention are included in the detailed description and the accompanying drawings.

Advantageous Effects

According to the embodiments of the present invention, at least the following effects are provided.

The transition metal compound of the present invention can be used for preparing an olefin polymerization catalyst having high activity and being highly capable of achieving copolymerization even at a high temperature, and a polyolefin prepared using the catalyst for polymerization thereof can exhibit excellent physical properties such as low density, high molecular weight, and the like.

In addition, since a mixture of transition metal compounds prepared without separation of ligands is used as is, the production costs can be lowered compared to the level of olefin polymerization performance.

The effects of the present invention are not limited by the foregoing, and other various effects are included in the present specification.

MODES OF THE INVENTION

Figure 1:
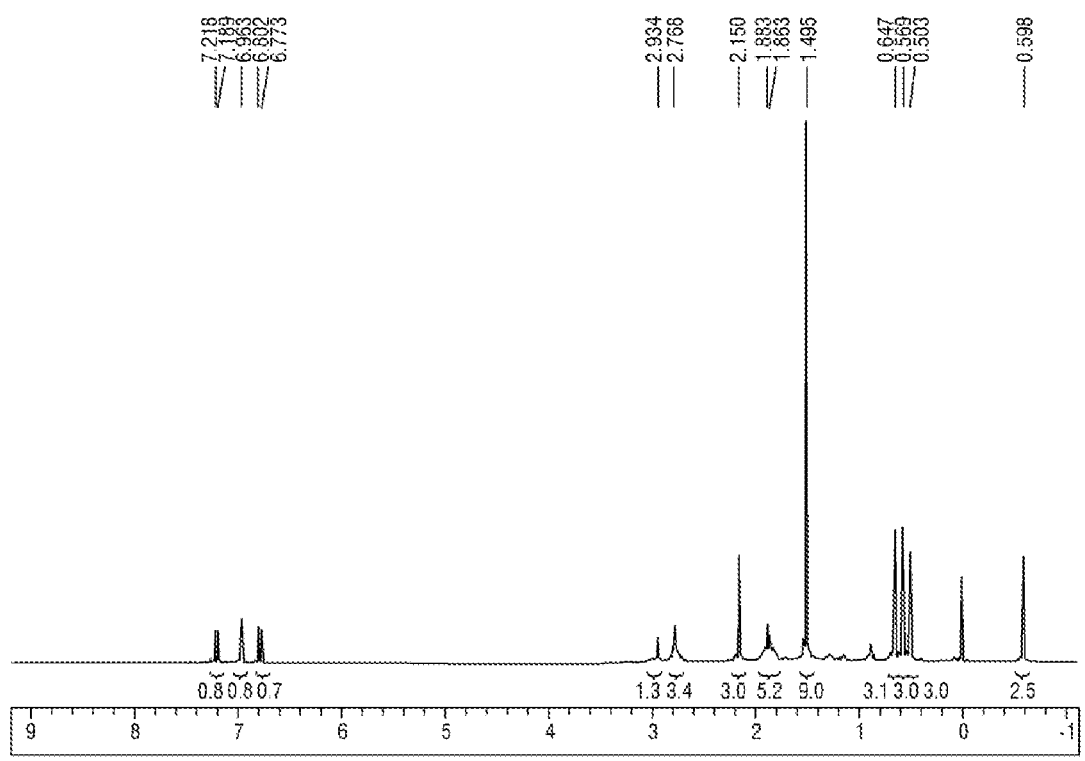
FIG. 1 is an ¹H-NMR spectrum of dimethylsilyl(t-butylamido)(2-methyl-6,7,8,9-tetrahydro-3H-cyclopenta[a]naphthalen-3-yl)dimethyl titanium, which is a compound represented by Chemical Formula A3.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the scope of the invention to those skilled in the art, and the present invention will only be defined by the appended claims.

As used herein, the term "$C_{A-B}$" means that "there are between A and B carbon atoms, inclusive," and the term "A to B" means "between A and B, inclusive." In addition, in the term "substituted or unsubstituted," "substituted" means that "at least one hydrogen atom in the hydrocarbon compound or hydrocarbon derivative has been substituted with a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido, or a $C_{1-20}$ alkylidene" and "unsubstituted" means that "not even one hydrogen atom in the hydrocarbon compound or hydrocarbon derivative has been substituted with a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido, or a $C_{1-20}$ alkylidene."

In one embodiment of the present invention, the transition metal compound for an olefin polymerization catalyst may be represented by the following Chemical Formula A1.

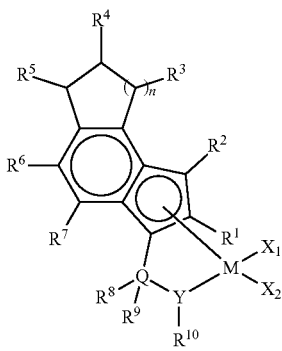

<Chemical Formula A1>

In Chemical Formula A1, n may be 1 to 4, M may be titanium (Ti), zirconium (Zr), or hafnium (Hf), Q may be a Group 14 element such as silicon (Si), carbon (C) or the like, Y may be a Group 15 element such as nitrogen (N), phosphorus (P), or the like, or when $R^{10}$ is unsubstituted, a Group 16 element such as oxygen (O), sulfur (S), or the like, $X_1$ and $X_2$ may be each independently a halogen, a $C_{1-20}$ alkyl, a $C_{2-20}$ alkenyl, a $C_{2-20}$ alkynyl, a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido, or a $C_{1-20}$ alkylidene, and $R^1$ to $R^{10}$ may be each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl.

Specifically, the transition metal compound may be represented by the following Chemical Formula A2.

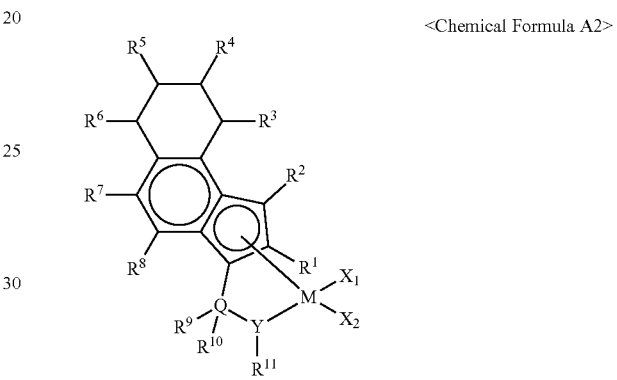

<Chemical Formula A2>

In Chemical Formula A2, M may be Ti, Zr, or Hf, Q may be Si, Y may be N, $X_1$ and $X_2$ may be each independently a halogen or a $C_{1-20}$ alkyl, $R^1$ and $R^9$ to $R^{11}$ may be each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ may be each a hydrogen atom.

More specifically, the transition metal compound may be at least one of the compounds represented by the following Chemical Formulas a-1 to a-24.

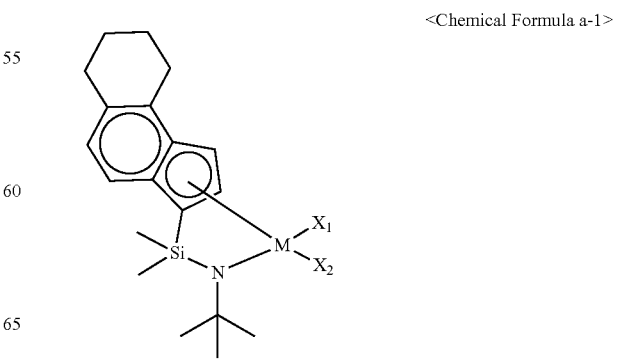

<Chemical Formula a-1>

-continued
<Chemical Formula a-2>
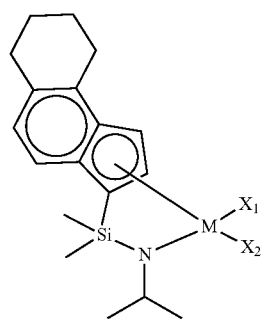
<Chemical Formula a-3>
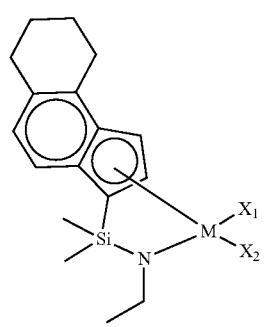
<Chemical Formula a-4>
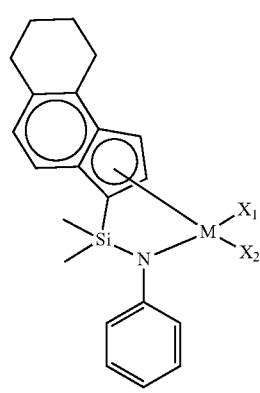
<Chemical Formula a-5>
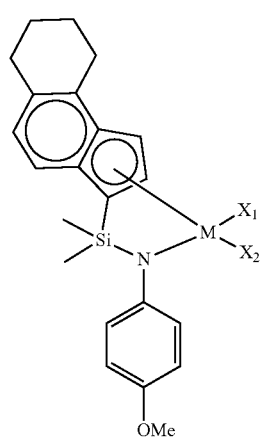
-continued
<Chemical Formula a-6>
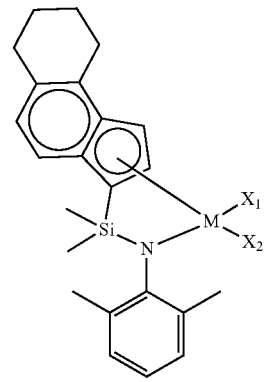
<Chemical Formula a-7>
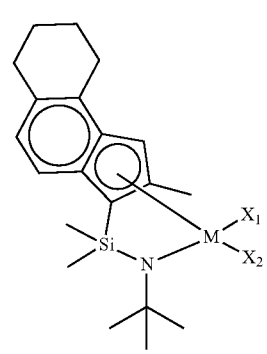
<Chemical Formula a-8>
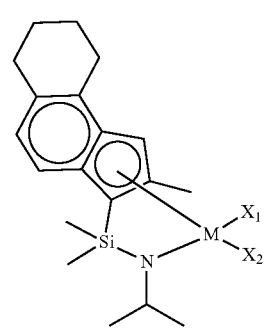
<Chemical Formula a-9>
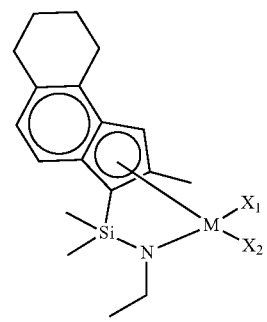

<Chemical Formula a-10>
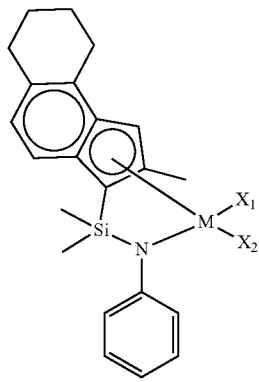
<Chemical Formula a-11>
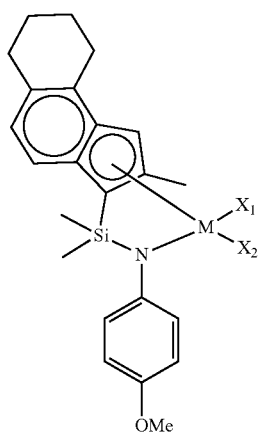
<Chemical Formula a-12>
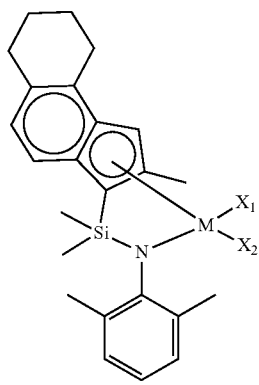
<Chemical Formula a-13>
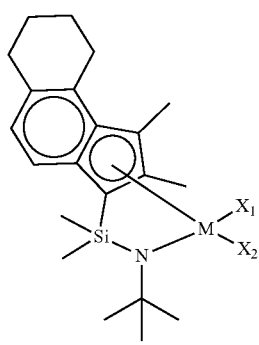
<Chemical Formula a-14>
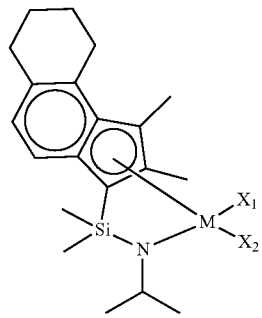
<Chemical Formula a-15>
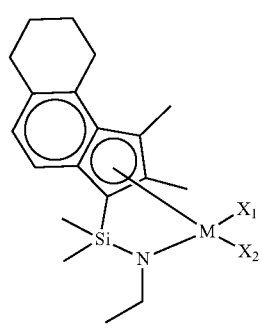
<Chemical Formula a-16>
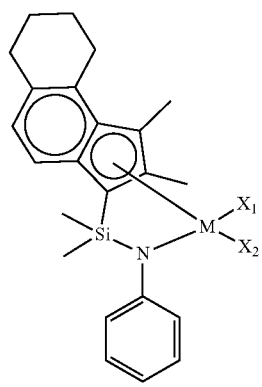
<Chemical Formula a-17>
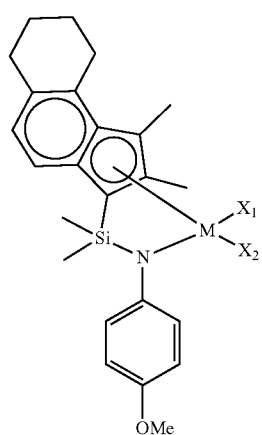

<Chemical Formula a-18>

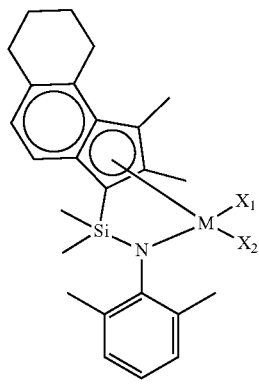

<Chemical Formula a-19>

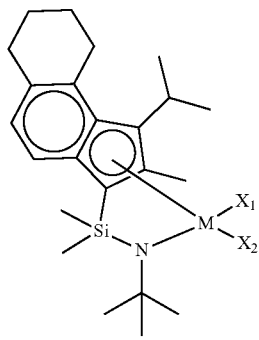

<Chemical Formula a-20>

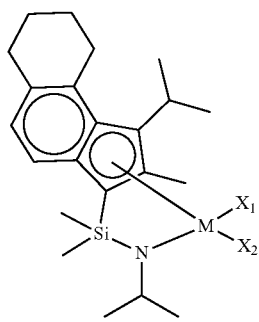

<Chemical Formula a-21>

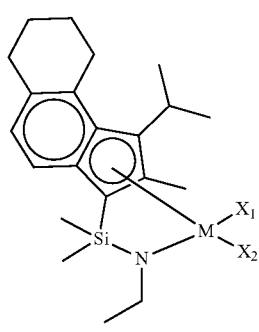

<Chemical Formula a-22>

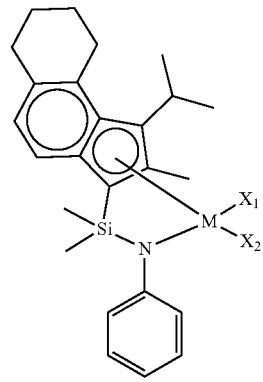

<Chemical Formula a-23>

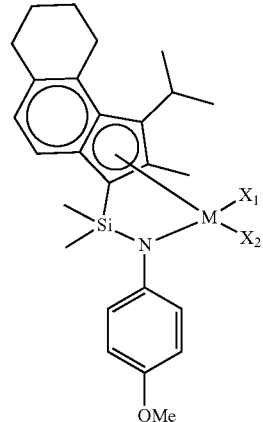

<Chemical Formula a-24>

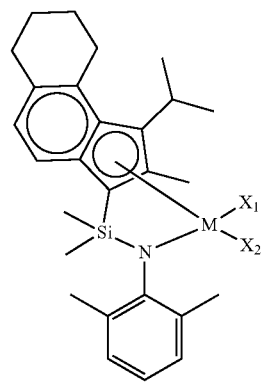

In Chemical Formulas a-1 to a-24, M may be Ti, Zr, or Hf, and $X_1$ and $X_2$ may be each independently a halogen or a $C_{1-20}$ alkyl.

In another embodiment of the present invention, the transition metal compound for an olefin polymerization catalyst may be represented by the following Chemical Formula B1.

<Chemical Formula B1>

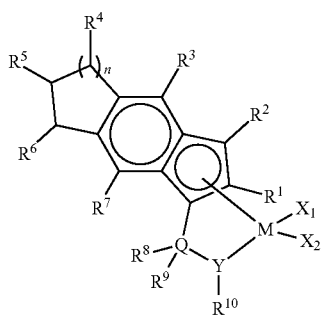

In Chemical Formula B1, n may be 1 to 4, M may be Ti, Zr, or Hf, Q may be a Group 14 element such as Si, C, or the like, Y may be a Group 15 element such as N, P, or the like, or when $R^{10}$ is unsubstituted, a Group 16 element such as O, S, or the like, $X_1$ and $X_2$ may be each independently a halogen, a $C_{1-20}$ alkyl, a $C_{2-20}$ alkenyl, a $C_{2-20}$ alkynyl; a $C_{6-20}$ aryl, a $C_{1-20}$ alkyl $C_{6-20}$ aryl, a $C_{6-20}$ aryl $C_{1-20}$ alkyl, a $C_{1-20}$ alkylamido, a $C_{6-20}$ arylamido, or a $C_{1-20}$ alkylidene, and $R^1$ to $R^{10}$ may be each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl.

Specifically, the transition metal compound may be represented by the following Chemical Formula B2.

<Chemical Formula B2>

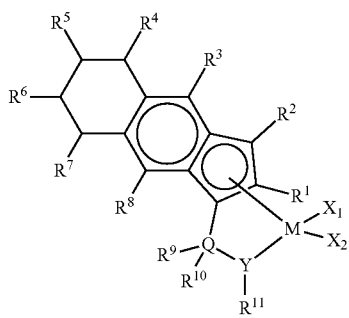

In Chemical Formula B2, M may be Ti, Zr, or Hf, Q may be Si, Y may be N, $X_1$ and $X_2$ may be each independently a halogen or a $C_{1-20}$ alkyl, $R^1$ and $R^9$ to $R^{11}$ may be each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ may be each a hydrogen atom.

More specifically, the transition metal compound may be at least one of the compounds represented by the following Chemical Formulas b-1 to b-24.

<Chemical Formula b-1>

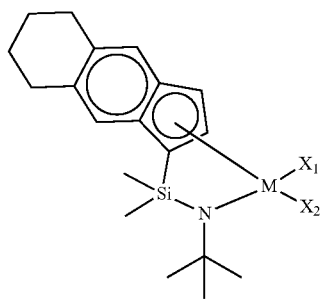

<Chemical Formula b-2>

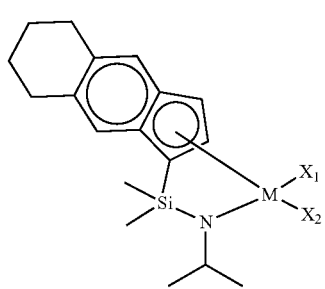

<Chemical Formula b-3>

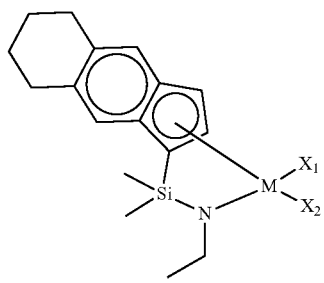

<Chemical Formula b-4>

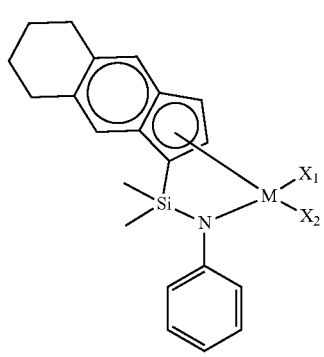

<Chemical Formula b-5>

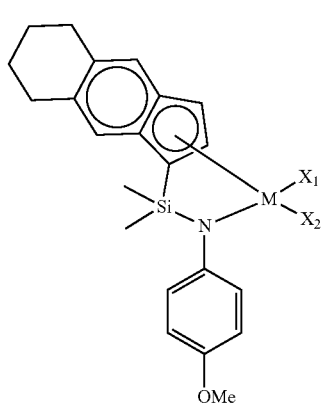

<Chemical Formula b-6>
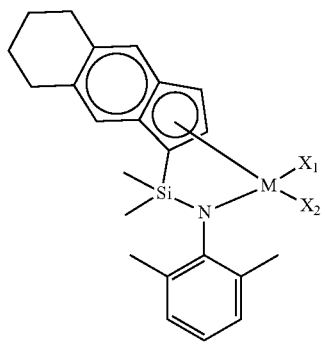
<Chemical Formula b-7>
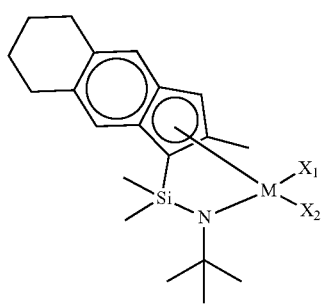
<Chemical Formula b-8>
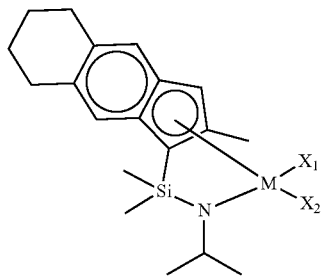
<Chemical Formula b-9>
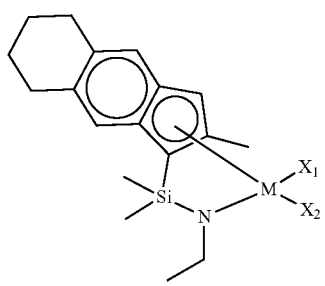
<Chemical Formula b-10>
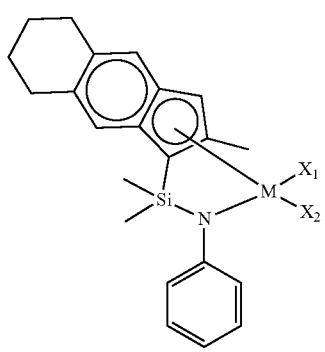
<Chemical Formula b-11>
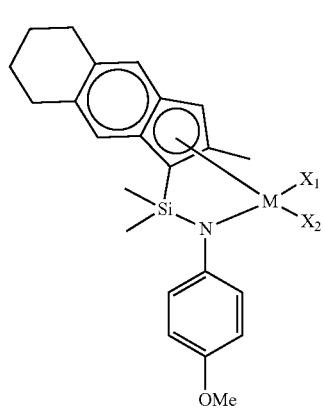
<Chemical Formula b-12>
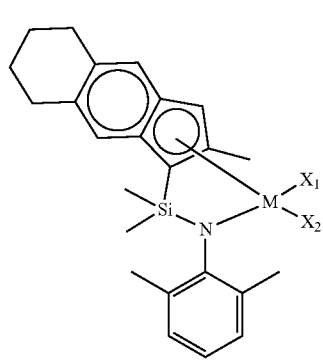
<Chemical Formula b-13>
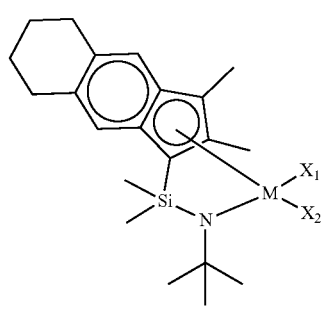
<Chemical Formula b-14>
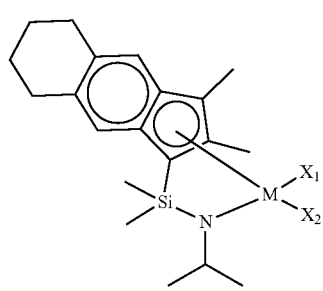

<Chemical Formula b-15>
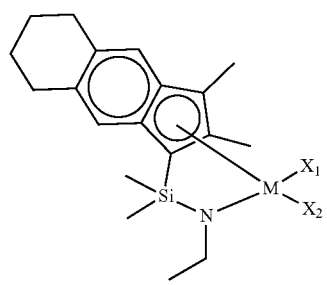
<Chemical Formula b-16>
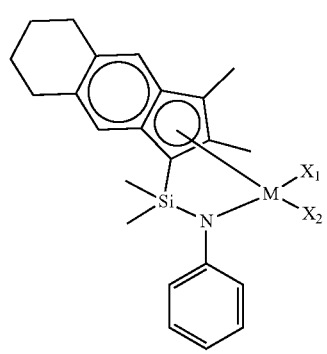
<Chemical Formula b-17>
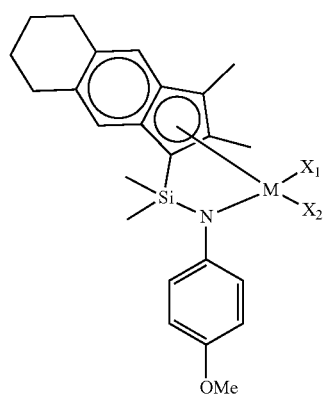
<Chemical Formula b-18>
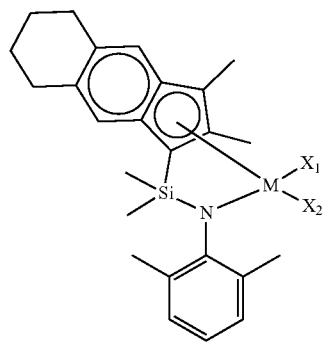
<Chemical Formula b-19>
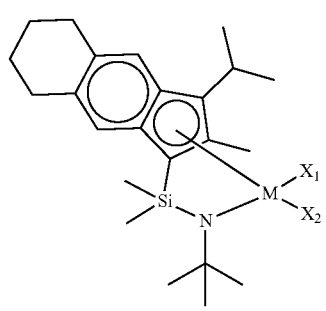
<Chemical Formula b-20>
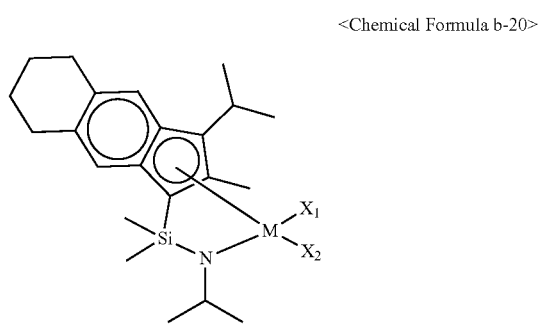
<Chemical Formula b-21>
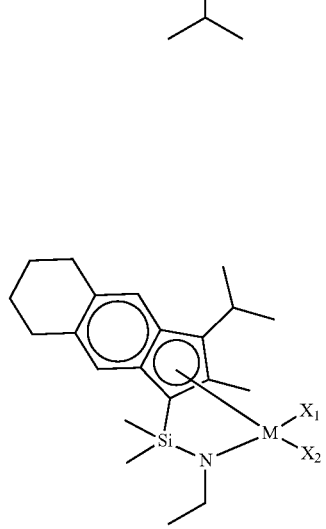
<Chemical Formula b-22>
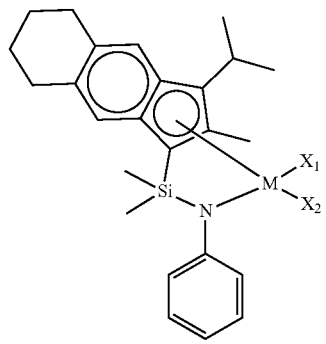

<Chemical Formula b-23>

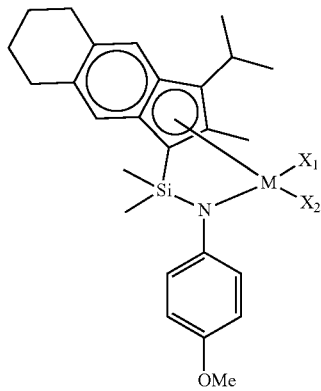

<Chemical Formula b-24>

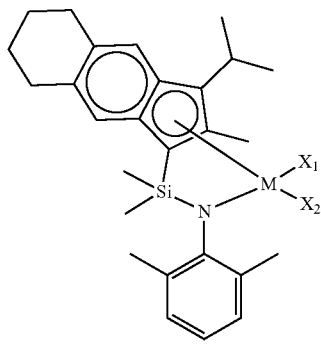

In Chemical Formulas b-1 to b-24, M may be Ti, Zr, or Hf, and $X_1$ and $X_2$ may be each independently a halogen or a $C_{1-20}$ alkyl.

In one embodiment of the present invention, the olefin polymerization catalyst may contain: a main catalyst compound including one or more of the above-exemplified transition metal compounds; and a co-catalyst compound.

The main catalyst compound may include one or more of the compound represented by Chemical Formula A1 and the compound represented by Chemical Formula B1.

In some embodiments, the main catalyst compound may be a mixture of the compound represented by Chemical Formula A1 and the compound represented by Chemical Formula B1. In the main catalyst compound, the molar content of the compound of Chemical Formula A1 may be higher than the molar content of the compound of Chemical Formula B1. More specifically, the molar ratio of the compound of Chemical Formula A1 to the compound of Chemical Formula B1 may be 2 to 4:1.

According to one exemplary embodiment, it is possible to obtain a mixture containing the compound of Chemical Formula A1 and the compound of Chemical Formula B1 in a 3:1 molar ratio through a process of preparing the transition metal compounds of Chemical Formulas A1 and B1 that includes a ligand synthesis step in which the synthesis of the ligand of Chemical Formula A1 is not carried out separately from the synthesis of the ligand of Chemical Formula B1. When the mixture is used as is, the costs of polymerization catalyst production can be lowered compared to the level of olefin polymerization performance.

However, the present invention is not limited thereto, and it is also possible that the compound of Chemical Formula A1 or the compound of Chemical Formula B1 is separated from the other and used alone, or the compound of Chemical Formula A1 and the compound of Chemical Formula B1 having been separated may be mixed again and used as a mixture.

The compound represented by Chemical Formula A1 may be the compound represented by Chemical Formula A2, or it may be at least one of the compounds represented by Chemical Formulas a-1 to a-24.

The compound represented by Chemical Formula B1 may be the compound represented by Chemical Formula B2, or it may be at least one of the compounds represented by Chemical Formulas b-1 to b-24.

The co-catalyst compound may include one or more of the compound represented by the following Chemical Formula 1, the compound represented by the following Chemical Formula 2, and the compound represented by the following Chemical Formula 3.

<Chemical Formula 1>

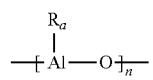

In Chemical Formula 1, n may be an integer of 2 or more, and $R_a$ may be a hydrogen atom, a halogen radical, a $C_{1-20}$ hydrocarbyl radical, or a $C_{1-20}$ hydrocarbyl radical substituted with a halogen.

<Chemical Formula 2>

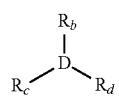

In Chemical Formula 2, D may be aluminum (Al) or boron (B), and $R_b$, $R_c$, and $R_d$ may be each independently a halogen radical, a $C_{1-20}$ hydrocarbyl radical, or a $C_{1-20}$ hydrocarbyl radical substituted with a halogen.

<Chemical Formula 3>

$[L\text{-}H]^+[Z(A)_4]^-$ or $[L]^+[Z(A)_4]^-$

In Chemical Formula 3, L may be a neutral or cationic Lewis base, $[L\text{-}H]^+$ and $[L]^+$ may be a Brønsted acid, Z may be a Group 13 element, and A may be each independently a $C_{6-20}$ aryl or a $C_{1-20}$ alkyl in which one or more hydrogen atoms have been substituted with a halogen radical, a $C_{1-20}$ hydrocarbyl radical, a $C_{1-20}$ alkoxy radical, or a $C_{6-20}$ aryloxy radical or have not been substituted.

The olefin polymerization catalyst may further contain a carrier.

There is no particular limitation on the carrier as long as it can support a transition metal compound for an olefin polymerization catalyst and a co-catalyst compound. In one exemplary embodiment, the carrier may be carbon, silica, alumina; zeolite, magnesium chloride, or the like.

As a method of supporting a transition metal compound for an olefin polymerization catalyst and a co-catalyst compound on the carrier, a physical adsorption method or a chemical adsorption method may be used.

In one, exemplary embodiment, the physical adsorption method may be a method in which a carrier is brought into contact with a solution containing a transition metal compound for an olefin polymerization catalyst dissolved therein and then dried, a method in which a carrier is brought into contact with a solution containing both a transition metal compound for an olefin polymerization catalyst and a co-catalyst compound dissolved therein and then dried, or a method in which a carrier supporting a transition metal compound for an olefin polymerization catalyst and a carrier supporting a co-catalyst compound are prepared separately, respectively by bringing a carrier into contact with a solution containing the transition metal compound for an olefin polymerization catalyst dissolved therein and then drying the same and by bringing a carrier into contact with a solution containing the co-catalyst compound dissolved therein and then drying the same, and are subsequently mixed together.

In one exemplary embodiment, the chemical adsorption method may be a method in which a co-catalyst compound is first supported on the surface of a carrier and then a transition metal compound for an olefin polymerization catalyst is supported on the co-catalyst compound, or a method in which a functional group on the surface of a carrier (e.g., in the case of silica, a hydroxyl group (—OH) on the silica surface) is linked to a catalyst compound through a covalent bond.

The total amount of supported main catalyst compound, including the transition metal compound, may be 0.001 mmol to 1 mmol based on 1 g of the carrier, and the amount of supported co-catalyst compound may be 2 mmol to 15 mmol based on 1 g of the carrier.

However, the use of such a carrier is not essential, and the decision as to whether or not a carrier should be used may be appropriately made depending on necessity.

Meanwhile, a polyolefin may be prepared by polymerizing olefin-based monomers in the presence of the above-described olefin polymerization catalyst of the present invention.

The polyolefin may be, for example, a homopolymer or copolymer obtained by a polymerization reaction such as free-radical polymerization, cationic polymerization, coordination polymerization, condensation polymerization, addition polymerization, or the like, but the present invention is not limited thereto.

In one exemplary embodiment, the polyolefin may be produced by gas-phase polymerization, solution polymerization, slurry polymerization, or the like. Examples of the solvent that may be used for preparing the polyolefin by solution polymerization or slurry polymerization may include: $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms, such as dichloromethane and chlorobenzene; mixtures thereof; and the like, but the present invention is not limited thereto.

The olefin-based monomer may be one or more selected from the group consisting of a $C_{2-20}$ α-olefin, a $C_{1-20}$ diolefin, a $C_{3-20}$ cycloolefin, and a $C_{3-20}$ cyclodiolefin.

In one exemplary embodiment, the olefin-based monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer containing only one type of the above-exemplified olefin-based monomer or a copolymer containing two or more types of the above-exemplified olefin-based monomer.

Preferably, the polyolefin is a copolymer of ethylene and 1-octene, but the present invention is not limited thereto.

The polyolefin obtained by polymerization in the presence of the olefin polymerization catalyst of the present invention may have a molecular weight (Mw) of 250,000 or more, and may specifically have a molecular weight (Mw) of 300,000 or more when the density is 0.908 g/cm³ or less. In addition, the polyolefin may have a density of 0.908 g/cm³ or less, a melting point of 98° C. or less, and a catalyst activity of 80 kg/mmol·h or more.

In regard to the obtained polyolefin, the molecular weight (Mw) of 250,000 or more is favorable in terms of the tensile strength of the polyolefin, the density of 0.908 g/cm³ or less or the melting point of 98° C. or less is favorable in terms of the elastic modulus and transparency of the polyolefin, and the catalyst activity of 80 kg/mmol·h or more is favorable in terms of the reduction of polyolefin production costs because it leads to excellent polymerization reactivity with respect to the amount of catalyst used.

More specifically, not only the polyolefin obtained by polymerization in the presence of an olefin polymerization catalyst containing only one of the compound of Chemical Formula A1 and the compound of Chemical Formula B1 but also the polyolefin obtained by polymerization in the presence of an olefin polymerization catalyst containing the above-described mixture of the compound of Chemical Formula A1 and the compound of Chemical Formula B1, which was synthesized without separation of ligands, can exhibit excellent physical properties as those described above. In other words, the mixture of the compound of Chemical Formula A1 and the compound of Chemical Formula B1 as is can be used without further separation, and accordingly, the costs of polymerization catalyst production can be lowered compared to the level of olefin polymerization performance.

Hereinafter, details of preparation examples regarding, among the transition metal compounds for an olefin polymerization catalyst of the present invention, the compound represented by the following Chemical Formula A3, the compound represented by the following Chemical Formula B3, and a mixture thereof, and details of an experimental example for evaluating the physical properties of the polyolefins obtained by polymerization in the presence of an olefin polymerization catalyst containing the above-described transition metal compound(s) will be described.

<Chemical Formula A3>

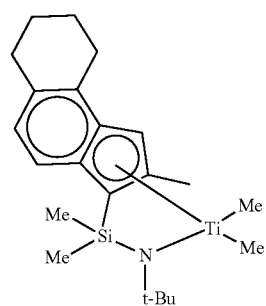

<Chemical Formula B3>

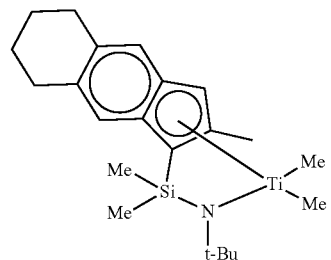

<Preparation Example 1> Preparation of Compound of Chemical Formula A3

Preparation Example 1-1: Preparation of 2-methyl-2,3,6,7,8,9-hexahydro-1H-cyclopenta[a]naphthalen-1-one 2-Bromo-2-methylpropanoyl bromide (17.4 g, 76 mmol) and a solution prepared by diluting 1,2,3,4-tetrahydronaphthalene (10.0 g, 76 mmol) in dichloromethane (200 mL) were added, at 0° C., to a solution prepared by dispersing $AlCl_3$ (25.2 g, 189 mmol) in dichloromethane (200 mL). After completion of the addition, the mixture was stirred at room temperature for 12 hours, and water was added at 0° C. to terminate the reaction. Afterward, the organic layer was extracted, the solvent was removed in vacuo, the resultant was subjected to column chromatography, and thereby 7.9 g (52%) of 2-methyl-2,3,6,7,8,9-hexahydro-1H-cyclopenta[a]naphthalen-1-one was obtained.

$^1$H-NMR (CDCl$_3$, 300 MHz): d 7.50 (d, 1H), 7.10 (d, 1H), 3.22 (dd, 1H), 2.86-2.83 (m, 2H), 2.69-2.66 (m, 3H), 2.50 (dd, 1H), 1.92-1.77 (m, 4H), 1.30 (d, 3H).

Preparation Example 1-2: Preparation of 2-methyl-2,3,6,7,8,9-hexahydro-1H-cyclopenta[a]naphthalen-1-ol Sodium borohydride (NaBH$_4$) (1.3 g, 35 mmol) was added, at 0° C., to a solution prepared by diluting the 2-methyl-2,3,6,7,8,9-hexahydro-1H-cyclopenta[a]naphthalen-1-one (5.9 g, 29 mmol) obtained in Preparation Example 1-1 in methanol (80 mL). The temperature was gradually raised to room temperature, and thereafter the mixture was stirred for one hour. After completion of the reaction, methanol was removed in vacuo, water and dichloromethane were subsequently added, and then the organic layer was extracted. Afterward, moisture was removed with magnesium sulfate, the solvent was removed in vacuo, and thereby 5.9 g (99%, isomer mixture) of 2-methyl-2,3,6,7,8,9-hexahydro-1H-cyclopenta[a]naphthalen-1-ol was obtained.

$^1$H-NMR (CDCl$_3$, 300 MHz): d 7.19-7.13 (m, 1H), 7.01-6.96 (m, 1H), 4.96 and 4.71 (2 broad t, 1H), 2.4-3.1 (m, 6H), 2.30-2.24 (m, 1H), 1.82-1.75 (m, 4H), 1.68 and 1.37 (2d, 1H), 1.25 and 1.18 (2d, 3H).

Preparation Example 1-3: Preparation of 2-methyl-6,7,8,9-tetrahydro-3H-cyclopenta[a]naphthalene The 2-methyl-2,3,6,7,8,9-hexahydro-1H-cyclopenta[a]naphthalen-1-ol (5.9 g, 29 mmol) obtained in Preparation Example 1-2 and p-toluenesulfonic acid (0.5 mol %) were added to toluene (60 mL), and the mixture was stirred for one hour while refluxing at 110° C. After completion of the reaction, water was removed with magnesium sulfate, the solvent was removed in vacuo, and thereby 5.2 g (97%) of 2-methyl-6,7,8,9-tetrahydro-3H-cyclopenta[a]naphthalene was obtained.

$^1$H-NMR (CDCl$_3$, 300 MHz); d 7.00 (2d, 2H), 6.45 (s, 1H), 3.12 (s; 2H), 2.81 (t, 2H), 2.71 (t, 2H), 2.15 (s, 3H), 1.85-1.82 (m, 4H).

Preparation Example 1-4: Preparation of (2-methyl-6,7,8,9-tetrahydro-3H-cyclopenta[a]naphthalen-3-yl)chlorodimethylsilane n-Butyllithium (8.2 g, 19 mmol, a 1.6 M solution in hexane) was added slowly, at −30° C., to a solution prepared by diluting the 2-methyl-6,7,8,9-tetrahydro-3H-cyclopenta[a]naphthalene (3.2 g, 17 mmol) obtained in Preparation Example 1-3 in hexane (80 mL). The temperature was gradually raised to room temperature, and thereafter the mixture was stirred for 12 hours. After stirring, the resulting white solid was isolated through filtration and then dried in vacuo, and thereby 2.7 g (81%) of a lithium salt compound was obtained.

A dispersion of the above-described lithium salt compound (2.7 g, 14 mmol) in diethyl ether (40 mL) was added slowly, at −78° C., to a solution prepared by diluting dichlorodimethylsilane (Me$_2$SiCl$_2$) (5.5 g, 42 mmol) in diethyl ether (80 mL). The temperature was gradually raised to room temperature, and thereafter the mixture was stirred for 12 hours. After completion of the reaction, the solvent was removed in vacuo, and the resultant was subjected to extraction with hexane and subsequent filtration. After removal of the solvent in vacuo, 3.3 g (85%) of (2-methyl-6,7,8,9-tetrahydro-3H-cyclopenta[a]naphthalen-3-yl)chlorodimethylsilane was obtained.

$^1$H-NMR (CDCl$_3$, 300 MHz): d 7.18 (d, 1H), 6.83 (d, 1H), 6.66 (s, 1H), 3.52 (s, 1H), 2.81-2.79 (m, 4H), 2.28 (s, 3H), 1.84-1.81 (m, 4H), 0.42 (s, 3H), 0.12 (s, 3H).

Preparation Example 1-5: Preparation. of N-tert-butyl-1,1-dimethyl-1-(2-methyl-6,7,8,9-tetrahydro-3H-cyclopenta[a]naphthalen-3-yl)silanamine A solution prepared by diluting the (2-methyl-6,7,8,9-tetrahydro-3H-cyclopenta[a]naphthalen-3-yl)chlorodimethylsilane (3.3 g, 12 mmol) obtained in Preparation Example 1-4 in THF (30 mL) was added slowly, at −30° C., to a solution prepared by diluting t-butylamine (t-BuNH$_2$) (3.5 g, 48 mmol) in THF (20 mL). The temperature was gradually raised to room temperature, and thereafter the mixture was stirred for 12 hours. After completion of the reaction, all the solvent was removed in vacuo, and the resultant was subjected to extraction with hexane and subsequent filtration. After removal of the hexane in vacuo, 3.7 g (99%) of N-tert-butyl-1,1-dimethyl-1-(2-methyl-6,7,8,9-tetrahydro-3H-cyclopenta[a]naphthalen-3-yl)silanamine was obtained.

$^1$H-NMR (CDCl$_3$, 300 MHz): d 7.17 (d, 1H), 6.78 (d, 1H), 6.57 (s, 1H), 3.33 (s, 1H), 2.82-2.79 (m, 4H), 2.27 (s, 3H), 1.84-1.81 (m, 4H), 1.12 (s, 9H), 0.60 (broad s, 1H), 0.13 (s, 3H), 0.11 (s, 3H).

Preparation Example 1-6: Preparation of dimethylsilyl(t-butylamido)(2-methyl-6,7,8,9-tetrahydro-3H-cyclopenta[a]naphthalen-3-yl)dimethyl titanium Methyllithium (4.0 g, 8.8 mmol, a 1.6 M solution in diethyl ether) was added, at −30° C., to a solution prepared by diluting the N-tert-butyl-1,1-dimethyl-1-(2-methyl-6,7,8,9-tetrahydro-3H-cyclopenta[a]naphthalen-3-yl)silanamine (676 mg, 2.2 mmol) obtained in Preparation Example 1-5 in diethyl ether (20 ml). The temperature was gradually raised to room temperature, and thereafter the mixture was stirred for two hours. Afterward, TiCl$_4$ (409 mg, 2.2 mmol) diluted in pentane (4 mL) was added slowly at −30° C., and the mixture was stirred for two hours. After completion of the reaction, all the solvent was removed in vacuo, and the resultant was subjected to extraction with hexane and subsequent filtration. After removal of the hexane in vacuo, 670 mg (80%) of dimethylsilyl(t-butylamido)(2-methyl-6,7,8,9-tetrahydro-3H-cyclopenta[a]naphthalen-3-yl)dimethyl titanium, which is the compound of Chemical Formula A3, was obtained.

FIG. 1 is an $^1$H-NMR spectrum of dimethylsilyl(t-butylamido)(2-methyl-6,7,8,9-tetrahydro-3H-cyclopenta[a]naphthalen-3-yl)dimethyl titanium, which is the compound of Chemical Formula A3, wherein the spectrum is as follows:

$^1$H-NMR (CDCl$_3$, 300 MHz): d 7.20 (d, 1H), 6.96 (s, 1H), 6.79 (d, 1H), 2.93-2.77 (m, 4H), 2.15 (s, 3H), 1.89-1.85 (m, 4H), 1.50 (s, 9H), 0.65 (s, 3H), 0.57 (s, 3H), 0.50 (s, 3H), 0.60 (s, 3H).

<Preparation Example 2> Preparation of Mixture of Compound of Chemical Formula A3 and Compound of Chemical Formula B3

Preparation Example 2-1: Preparation of Mixture of 2-methyl-2,3,6,7,8,9-hexahydro-1H-cyclopenta[a]naphthalen-1-one and 2-methyl-2,3,5,6,7,8-hexahydro-1H-cyclopenta[b]naphthalen-1-one 2-Bromo-2-methylpropanoyl bromide (17.4 g, 75.64 mmol) and a solution prepared by diluting 1,2,3,4-tetrahydronaphthalene (10.0 g, 72.64 mmol) in dichloromethane (100 mL) were added, at 0° C., to a solution prepared by dispersing AlCl$_3$ (25.2 g, 189.1 mmol) in dichloromethane (400 mL). After completion of the addition, the mixture was stirred at room temperature for 12 hours. Afterward, water was added at 0° C. to terminate the reaction, the organic layer was extracted, the solvent was subsequently removed in vacuo, and thereby 14.9 g (98%) of a mixture of 2-methyl-2,3,6,7,8,9-hexahydro-1H-cyclopenta[a]naphthalen-1-one and 2-methyl-2,3,5,6,7,8-hexahydro-1H-cyclopenta[b]naphthalen-1-one was obtained.

$^1$H-NMR (CDCl$_3$, 300 MHz): d 7.50 (d, 1H), 7.47 (s, 1H), 7.15 (s, 1H), 7.09 (d, 1H), 3.35-3.17 (m, 2H), 2.85-2.83 (m, 4H), 2.69-2.48 (m, 8H), 1.86-1.81 (m, 8H), 1.32-1.28 (d, 6H)

Preparation Example 2-2: Preparation of Mixture of 2-methyl-2,3,6,7,8,9-hexahydro-1H-cyclopenta[a]naphthalen-1-ol and 2-methyl-2,3,5,6,7,8-hexahydro-1H-cyclopenta[b]naphthalen-1-ol Sodium borohydride (NaBH$_4$) (2.2 g, 58.02 mmol) was added, at 0° C., to a solution prepared by diluting the mixture of 2-methyl-2,3,6,7,8,9-hexahydro-1H-cyclopenta[a]naphthalen-1-one and 2-methyl-2,3,5,6,7,8-hexahydro-1H-cyclopenta[b]naphthalen-1-one obtained in Preparation Example 2-1 (9.7 g, 48.35 mmol) in methanol (150 mL). The temperature was gradually raised to room temperature, and thereafter the mixture was stirred for two hours. After completion of the reaction, methanol was removed in vacuo, water and dichloromethane were added, and then the organic layer was extracted. Afterward, moisture was removed with magnesium sulfate, the solvent was removed in vacuo, and thereby 9.7 g (99%, isomer mixture) of a mixture of 2-methyl-2,3,6,7,8,9-hexahydro-1H-cyclopenta[a]naphthalen-1-ol and 2-methyl-2,3,5,6,7,8-hexahydro-1H-cyclopenta[b]naphthalen-1-ol was obtained.

$^1$H-NMR (CDCl$_3$, 300 MHz): d 7.19-7.10 (m, 2H), 7.01-6.93 (m, 2H), 4.99-4.65 (m, 2H), 3.07-2.49 (m, 12H), 2.31-2.22 (m, 2H), 1.83-1.76 (m, 10H), 1.45-1.15 (m, 8H)

Preparation Example 2-3: Preparation of Mixture of 2-methyl-6,7,8,9-tetrahydro-3H-cyclopenta[a]naphthalene and 2-methyl-5,6,7,8-tetrahydro-1H-cyclopenta[b]naphthalene The mixture of 2-methyl-2,3,6,7,8,9-hexahydro-1H-cyclopenta[a]naphthalen-1-ol and 2-methyl-2,3,5,6,7,8-hexahydro-1H-cyclopenta[b]naphthalen-1-ol obtained in Preparation Example 2-2 (9.0 g, 44.55 mmol) and p-toluenesulfonic acid (0.5 mol %) were added to toluene (100 mL), and the mixture was stirred for one hour while refluxing at 110° C. After completion of the reaction, water was removed with magnesium sulfate, the solvent was removed in vacuo, and thereby 7.9 g (96%) of a mixture (in a 3:1 molar ratio) of 2-methyl-6,7,8,9-tetrahydro-3H-cyclopenta[a]naphthalene and 2-methyl-5,6,7,8-tetrahydro-1H-cyclopenta[b]naphthalene was obtained.

$^1$H-NMR (CDCl$_3$, 300 MHz): d 7.08 (s, 1H), 7.07 (d, 2H), 6.97 (s, 1H), 6.47 (s, 1H), 6.42 (s, 1H), 3.25 (s, 2H), 3.14 (s, 2H), 2.85-2.71 (m, 8H), 2.18 (s, 3H), 2.15 (s, 3H), 1.90-1.82 (m, 8H)

Preparation Example 2-4: Preparation of Mixture of (2-methyl-6,7,8,9-tetrahydro-3H-cyclopenta[a]naphthalen-3-yl)chlorodimethylsilane and (2-methyl-5,6,7,8-tetrahydro-1H-cyclopenta[b]naphthalen-1-yl)chlorodimethylsilane n-Butyllithium (19.1 g, 45.06 mmol, a 1.6 M solution in hexane) was added slowly, at −30° C., to a solution prepared by diluting the mixture of 2-methyl-6,7,8,9-tetrahydro-3H-cyclopenta[a]naphthalene and 2-methyl-5,6,7,8-tetrahydro-1H-cyclopenta[b]naphthalene obtained in Preparation Example 2-3 (7.5 g, 40.96 mmol) in hexane (250 mL). The temperature was gradually raised to room temperature, and thereafter the mixture was stirred for 12 hours. After stirring, the resulting white solid was isolated through filtration and then dried in vacuo, and thereby 7.0 g (90%) of a lithium salt compound was obtained.

A dispersion of the above-described lithium salt compound (6.8 g, 35.87 mmol) in diethyl ether (50 mL) was added slowly, at −78° C., to a solution prepared by diluting dichlorodimethylsilane (Me$_2$SiCl$_2$) (13.9 g, 107.6 mmol) in diethyl ether (100 mL). The temperature was gradually raised to room temperature, and thereafter the mixture was stirred for 12 hours. After completion of the reaction, the solvent was removed in vacuo, and the resultant was subjected to extraction with hexane and subsequent filtration. After removal of the solvent in vacuo, 9.4 g (94%) of a mixture (in a 3:1 molar ratio) of (2-methyl-6,7,8,9-tetrahydro-3H-cyclopenta[a]naphthalen-3-yl)chlorodimethylsilane and (2-methyl-5,6,7,8-tetrahydro-1H-cyclopenta[b]naphthalen-1-yl)chlorodimethylsilane was obtained.

$^1$H-NMR (CDCl$_3$, 300 MHz): d 7.18 (d, 1H), 7.12-7.03 (m, 2H), 6.84 (d, 1H), 6.66 (s, 1H), 6.51 (s, 1H), 3.60-3.45 (m, 2H), 2.90-2.70 (m, 8H), 2.27-2.17 (m, 6H), 1.90-1.70 (m, 8H), 0.42 (s, 6H), 0.12 (s, 6H)

Preparation Example 2-5: Preparation of Mixture of N-tert-butyl-1,1-dimethyl-1-(2-methyl-6,7,8,9-tetrahydro-3H-cyclopenta[a]naphthalen-3-yl)silanamine and N-tert-butyl-1,1-dimethyl-1-(2-methyl-5,6,7,8-tetrahydro-1H-cyclopenta[b]naphthalen-1-yl)silanamine A solution prepared by diluting the mixture of (2-methyl-6,7,8,9-tetrahydro-3H-cyclopenta[a]naphthalen-3-yl)chlorodimethylsilane and (2-methyl-5,6,7,8-tetrahydro-1H-cyclopenta[b]naphthalen-1-yl)chlorodimethylsilane obtained in Preparation Example 2-4 (6.2 g, 22.51 mmol) in THF (80 mL) was added slowly, at −30° C., to a solution prepared by diluting t-butylamine (t-BuNH$_2$) (6.6 g, 90.03 mmol) in THF (70 mL). The temperature was gradually raised to room temperature, and thereafter the mixture was stirred for 12 hours. After completion of the reaction, all the solvent was removed in vacuo, and the resultant was subjected to extraction with hexane and subsequent filtration. After removal of the hexane in vacuo, 6.95 g (99%) of a mixture (in a 3:1 molar ratio) of N-tert-butyl-1,1-dimethyl-1-(2-methyl-6,7,8,9-tetrahydro-3H-cyclopenta[a]naphthalen-3-yl)silanamine and N-tert-butyl-1,1-dimethyl-1-(2-methyl-5,6,7,8-tetrahydro-1H-cyclopenta[b]naphthalen-1-yl)silanamine was obtained.

$^1$H-NMR (CDCl$_3$, 300 MHz): d 7.42-6.77 (m, 4H), 6.57-6.42 (m, 2H), 3.70-3.18 (m, 2H), 2.70-2.90 (m, 8H), 2.10-2.30 (m, 6H), 1.70-1.90 (m, 8H), 1.20 (s, 9H), 1.15 (s, 9H), 0.60 (s, 2H), 0.13 (s, 6H), −0.11 (s, 6H)

Preparation Example 2-6: Preparation of Mixture of dimethylsilyl(t-butylamido)(2-methyl-6,7,8,9-tetrahydro-3H-cyclopenta[a]naphthalen-3-yl)dimethyltitanium and dimethylsilyl(t-butylamido)(2-methyl-5,6,7,8-tetrahydro-1H-cyclopenta[b]naphthalen-1-yl) dimethyl titanium Methyllithium (19.0 g, 42.02 mmol, a 1.6 M solution in diethyl ether) was added, at −30° C., to a solution prepared by diluting the mixture of N-tert-butyl-1,1-dimethyl-1-(2-methyl-6,7,8,9-tetrahydro-3H-cyclopenta[a]naphthalen-3-yl)silanamine and N-tert-butyl-1,1-dimethyl-1-(2-methyl-5,6,7,8-tetrahydro-1H-cyclopenta[b]naphthalen-1-yl) silanamine obtained in Preparation Example 2-5 (3.2 g, 10.25 mmol) in diethyl ether (100 mL). The temperature was gradually raised to room temperature, and thereafter the mixture was stirred for two hours. Afterward, TiCl$_4$ (1.9 g, 10.25 mmol) diluted in pentane (4 mL) was added slowly at −30° C., and the mixture was stirred for two hours. After completion of the reaction, all the solvent was removed in vacuo, and, the resultant was subjected to extraction with hexane and subsequent filtration. After removal of the hexane in vacuo, 3.1 g (84%) of a mixture (in a 3:1 molar ratio) of dimethylsilyl(t-butylamido)(2-methyl-6,7,8,9-tetrahydro-3H-cyclopenta[a]naphthalen-3-yl) dimethyl titanium, which is the compound of Chemical Formula A3, and dimethylsilyl(t-butylamido) (2-methyl-5,6,7,8-tetrahydro-1H-cyclopenta[b]naphthalen-1-yl)dimethyl titanium, which is the compound of Chemical Formula B3, was obtained.

Figure 2:
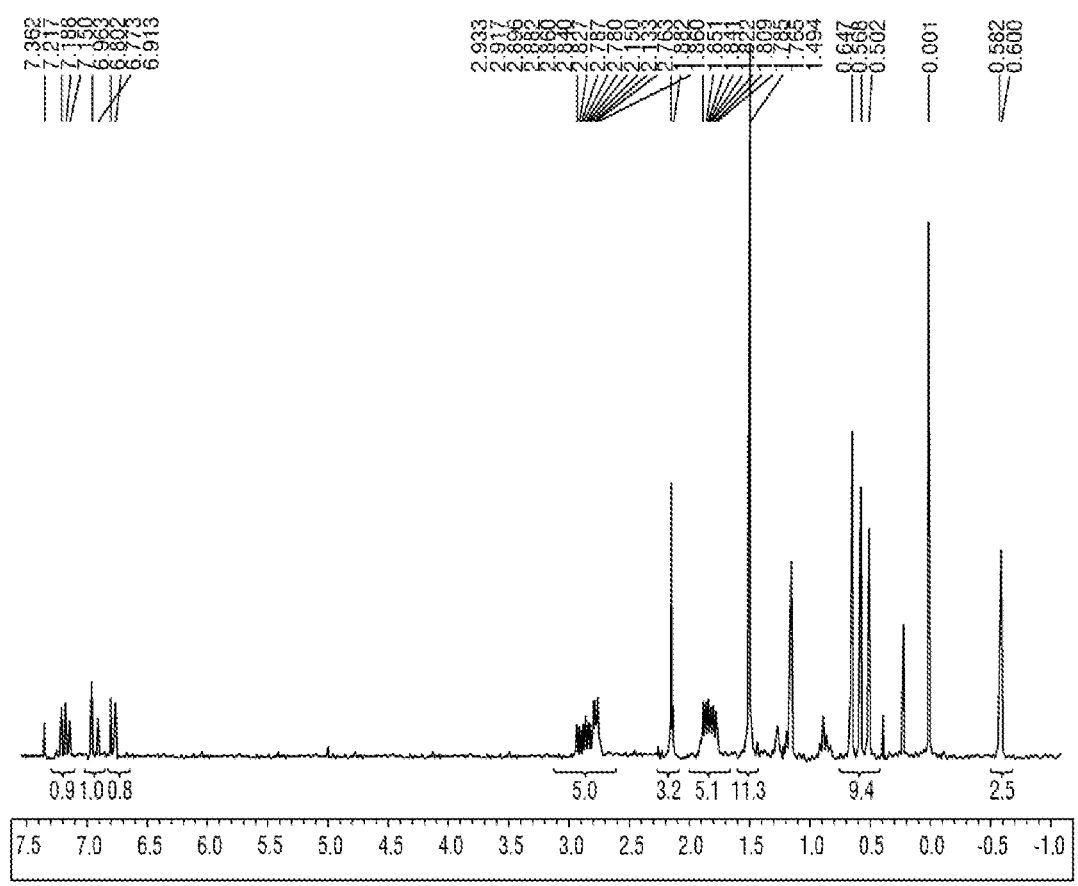
FIG. 2 is an $^1$H-NMR spectrum of a mixture (in a 3:1 molar ratio) of dimethylsilyl(t-butylamido) (2-methyl-6,7,8,9-tetrahydro-3H-cyclopenta[a]naphthalen-3-yl)dimethyl titanium, which is a compound represented by Chemical Formula A3, and dimethylsilyl(t-butylamido) (2-methyl-5,6,7,8-tetrahydro-1H-cyclopenta[b]naphthalen-1-yl)dimethyl titanium, which is a compound represented by Chemical Formula B3.

FIG. 2 is an $^1$H-NMR spectrum of a mixture (in a 3:1 molar ratio) of dimethylsilyl(t-butylamido) (2-methyl-6,7,8,9-tetrahydro-3H-cyclopenta[a]naphthalen-3-yl)dimethyl titanium, which is the compound of Chemical Formula A3, and dimethylsilyl(t-butylamido)(2-methyl-5,6,7,8-tetrahydro-1H-cyclopenta[b]naphthalen-1-yl)dimethyl titanium, which is the compound of Chemical Formula B3, wherein the spectrum is as follows:

$^1$H-NMR (CDCl$_3$, 300 MHz): d 7.36 (s, 1H), 7.20 (d, 1H), 7.15 (s, 1H), 6.96 (s, 1H), 6.91 (s, 1H), 6.78 (d, 1H), 2.93-2.70 (m, 8H), 2.15 (s, 3H), 2.13 (s, 3H), 1.88-1.77 (m, 8H), 1.49 (s, 18H), 0.65 (s, 6H), 0.57 (s, 6H), 0.50 (s, 6H), −0.58 (s, 6H)

<Preparation Example 3> Preparation of Compound of Chemical Formula B3

Preparation Example 3-1: Preparation of 2-methyl-2,3,5,6,7,8-hexahydro-1H-cyclopenta[b]naphthalen-1-one 2-Bromo-2-methylpropanoyl bromide (17.4 g) and a solution prepared by diluting 1,2,3,4-tetrahydronaphthalene (10.0 g) in dichloromethane (50 mL) were added, at 0° C., to a solution prepared by dispersing AlCl$_3$ (25.2 g, 2.5 eq.) in dichloromethane (500 mL). After completion of the addition, the mixture was stirred at room temperature for 12 hours. Afterward, water was added at 0° C. to terminate the reaction, and the organic layer was extracted. The solvent was subsequently removed in vacuo, the resultant was subjected to column chromatography, and thereby 2-methyl-2,3,5,6,7,8-hexahydro-1H-cyclopenta[b]naphthalen-1-one was obtained.

$^1$H-NMR (CDCl$_3$, 300 MHz): d 7.46 (s, 1H), 7.14 (s, 1H), 3.34-3.26 (m; 1H), 2.84-2.82 (m, 4H), 2.71-2.60 (m, 2H), 1.82-1.80 (m, 4H), 1.28 (d, 2H)

Preparation Example 3-2: Preparation of 2-methyl-2,3,5,6,7,8-hexahydro-1H-cyclopenta[b]naphthalen-1-ol Sodium borohydride (NaBH$_4$) (456 mg, 12.06 mmol) was added, at 0° C., to a solution prepared by diluting the 2-methyl-2,3,5,6,7,8-hexahydro-1H-cyclopenta[b]naphthalen-1-one (2.0 g, 10.05 mmol) obtained in Preparation Example 3-1 in methanol (100 mL). The temperature was gradually raised to room temperature, and thereafter the mixture was stirred for two hours. After completion of the reaction, methanol was removed in vacuo, water and dichloromethane were subsequently added, and then the organic layer was extracted. Afterward, moisture was removed with magnesium sulfate, all the solvent was subsequently removed in vacuo, and thereby 2.0 g (99%, isomer mixture) of 2-methyl-2,3,5,6,7,8-hexahydro-1H-cyclopenta[b]naphthalen-1-ol was obtained.

$^1$H-NMR (CDCl$_3$, 300 MHz): d 7.12 (s, 1H), 7.09 (s, 1H), 6.94 (s, 1H), 6.92 (s, 1H), 4.93 (broad t, 1H), 4.67 (broad t, 1H), 3.09-2.36 (m, 12H), 2.27-2.17 (m, 2H), 1.79-1.77 (m, 8H), 1.65 (d, 1H), 1.36 (d, 1H), 1.23 (d, 3H), 1.14 (d, 3H)

Preparation Example 3-3: Preparation of 2-methyl-5,6,7,8-tetrahydro-1H-cyclopenta[b]naphthalene The 2-methyl-2,3,5,6,7,8-hexahydro-1H-cyclopenta[b]naphthalen-1-ol (1.6 g, 8.13 mmol) obtained in Preparation Example 3-2 and p-toluenesulfonic acid (0.5 mol %) were added to toluene (30 mL), and the mixture was stirred for one hour while refluxing at 110° C. After completion of the reaction, water was removed with magnesium sulfate, the solvent was removed in vacuo, and thereby 1.5 g (97%) of 2-methyl-5,6,7,8-tetrahydro-1H-cyclopenta[b]naphthalene was obtained.

$^1$H-NMR (CDCl$_3$, 300 MHz): d 7.07 (s, 1H), 6.96 (s, 1H), 6.40 (s, 1H), 3.23 (s, 2H), 2.77-2.90 (m, 4H), 2.13 (s, 3H), 1.78-1.83 (m, 4H)

Preparation Example 3-4: Preparation of (2-methyl-5,6,7,8-tetrahydro-1H-cyclopenta[b]naphthalen-1-yl) chlorodimethylsilane n-Butyllithium (3.5 g, 8.17 mmol, a 1.6 M solution in hexane) was added slowly, at −30° C., to a solution prepared by diluting the 2-methyl-5,6,7,8-tetrahydro-1H-cyclopenta[b]naphthalene (1.4 g, 7.43 mmol) obtained in Preparation Example 3-3 in hexane (50 mL). The temperature was gradually raised to room temperature, and thereafter the mixture was stirred for 12 hours. After stirring, the resulting white solid was isolated through filtration and then dried in vacuo, and thereby 1.3 g (92%) of a lithium salt compound was obtained.

A dispersion of the above-described lithium salt compound (1.2 g, 6.56 mmol) in diethyl ether (20 mL) was added slowly, at −78° C., to a solution prepared by diluting dichlorodimethylsilane ($Me_2SiCl_2$) (2.5 g, 19.69 mmol) in diethyl ether (30 mL). The temperature was gradually raised to room temperature, and thereafter the mixture was stirred for 12 hours. After completion of the reaction, the solvent was removed in vacuo, and the resultant was subjected to extraction with hexane and subsequent filtration. After removal of the solvent in vacuo, 1.6 g (90%) of (2-methyl-5,6,7,8-tetrahydro-1H-cyclopenta[b]naphthalen-1-yl) chlorodimethylsilane was obtained.

$^1$H-NMR ($CDCl_3$, 300 MHz): d 7.12-7.00 (m, 2H), 6.52 (s, 1H), 3.61-3.45 (m, 1H), 2.70-2.90 (m, 4H), 2.17-2.23 (m, 3H), 1.70-1.85 (m, 4H), 0.41 (s, 3H), 0.14 (s, 3H)

Preparation Example 3-5: Preparation of N-tert-butyl-1,1-dimethyl-1-(2-methyl-5,6,7,8-tetrahydro-1H-cyclopenta[b]naphthalen-1-yl)silanamine A solution prepared by diluting the (2-methyl-5,6,7,8-tetrahydro-1H-cyclopenta[b]naphthalen-1-yl)chlorodimethylsilane (1.4 g, 5.15 mmol) obtained in Preparation Example 3-4 in THF (30 mL) was added slowly, at −30° C., to a solution prepared by diluting t-butylamine (t-$BuNH_2$) (1.5 g, 20.58 mmol) in THF (20 mL). The temperature was gradually raised to room temperature, and thereafter the mixture was stirred for 12 hours. After completion of the reaction, all the solvent was removed in vacuo, and the resultant was subjected to extraction with hexane and subsequent filtration. After removal of the hexane in vacuo, 1.5 g (94%) of N-tert-butyl-1,1-dimethyl-1-(2-methyl-5,6,7,8-tetrahydro-1H-cyclopenta[b]naphthalen-1-yl)silanamine was obtained.

$^1$H-NMR ($CDCl_3$, 300 MHz): d 7.31-6.85 (m, 2H), 6.52-6.41 (m, 1H); 3.63-3.24 (m, 1H), 2.60-2.85 (m, 4H), 2.21-2.03 (m, 6H), 1.75-1.85 (m, 4H), 1.19-1.15 (m, 9H), 0.39 (s, 1H), 0.07 (s, 3H), −0.11 (s, 3H)

Preparation Example 3-6: Preparation of dimethylsilyl(t-butylamido)(2-methyl-5,6,7,8-tetrahydro-1H-cyclopenta[b]naphthalen-1-yl)dimethyl titanium Methyllithium (6.1 g, 13.24 mmol, a 1.6 M solution in diethyl ether) was added, at −30° C., to a solution prepared by diluting the N-tert-butyl-1,1-dimethyl-1-(2-methyl-5,6,7,8-tetrahydro-1H-cyclopenta[b]naphthalen-1-yl)silanamine (1.0 g, 3.31 mmol) obtained in Preparation Example 3-5 in diethyl ether (20 mL). The temperature was gradually raised to room temperature, and thereafter the mixture was stirred for two hours. Afterward, $TiCl_4$ (628 mg, 3.31 mmol) diluted in pentane (4 mL) was added slowly at −30° C., and the mixture was stirred for two hours. After completion of the reaction, all the solvent was removed in vacuo, and the resultant was subjected to extraction with hexane and subsequent filtration. After removal of the hexane in vacuo, 985 mg (83%) of dimethylsilyl(t-butylamido)(2-methyl-5,6,7,8-tetrahydro-1H-cyclopenta[b]naphthalen-1-yl)dimethyl titanium, which is the compound of Chemical Formula B3, was obtained.

Figure 3:
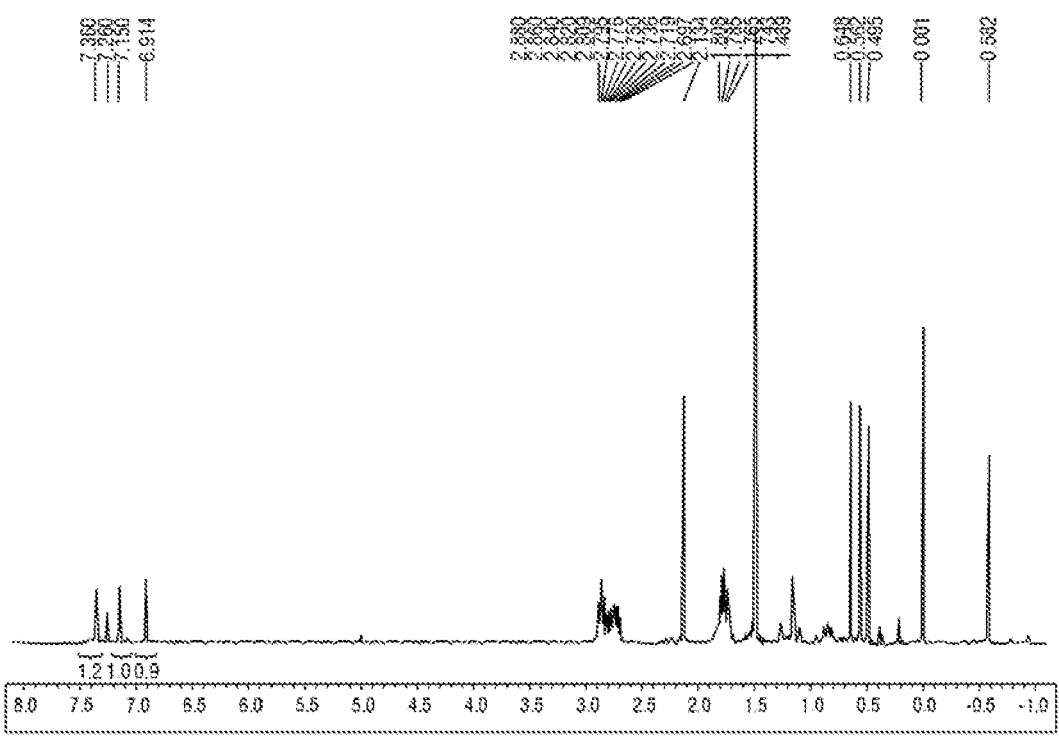
FIG. 3 is an $^1$H-NMR spectrum of dimethylsilyl(t-butylamido)(2-methyl-5,6,7,8-tetrahydro-1H-cyclopenta[b]naphthalen-1-yl)dimethyl titanium, which is a compound represented by Chemical Formula B3.

FIG. 3 is an $^1$H-NMR spectrum of dimethylsilyl(t-butylamido)(2-methyl-5,6,7,8-tetrahydro-1H-cyclopenta[b]naphthalen-1-yl)dimethyl titanium, which is the compound of Chemical Formula B3, wherein the spectrum is as follows:

$^1$H-NMR ($CDCl_3$, 300 MHz): d 7.36 (s, 1H), 7.15 (s, 1H), 6.91 (s, 1H), 2.88-2.70 (m, 4H), 2.13 (s, 3H), 1.81-1.74 (m, 4H), 1.49 (s, 9H), 0.65 (s, 3H), 0.56 (s, 3H), 0.50 (s, 3H), −0.58 (s, 3H)

<Preparation Example 4> Synthesis of Ethylene/1-Octene Copolymer Using Olefin Polymerization Catalyst Containing Compound of Chemical Formula A3

Ethylene and 1-octene were copolymerized as follows, using an olefin polymerization catalyst containing the above-described compound of Chemical Formula A3.

First, a hexane solvent (1 L) and 1-octene (45 g) were added to a 2-L autoclave reactor, and then the reactor was preheated to a temperature of 70° C. Next, the transition metal compound ($4 \times 10^{-6}$ M) of Chemical Formula A3 obtained in Preparation Example 1 and having been treated with a triisobutylaluminum compound was added to a catalyst storage tank and was subsequently introduced into the reactor by applying high-pressure argon thereto. A $2.4 \times 10^{-5}$ M dimethylanilinium tetrakis(pentafluorophenyl)borate co-catalyst was introduced into the reactor by applying high-pressure argon thereto. The polymerization reaction was carried out for five minutes, and the polymerization temperature was maintained as constant as possible at 90° C. by removing the heat of reaction using a cooling coil inside the reactor. After the polymerization reaction, the remaining gas was discharged, and the polymer solution was discharged through the lower part of the reactor and then cooled by adding an excessive amount of ethanol thereto to induce precipitation. The obtained polymer was washed two to three times with each of ethanol and acetone and then dried in a 80° C. vacuum oven for at least 12 hours, and thereby an ethylene/1-octene copolymer was obtained.

<Preparation Example 5> Synthesis of Ethylene/1-Octene Copolymer Using Olefin Polymerization Catalyst Containing Mixture of Compound of Chemical Formula A3 and Compound of Chemical Formula B3

An ethylene/1-octene copolymer was obtained in the same manner as in Preparation Example 4, except that a mixture (in a 3:1 molar ratio) of the compound of Chemical Formula A3 and the compound of Chemical Formula B3 was used as the transition metal compound.

<Preparation Example 6> Synthesis of Ethylene/1-Octene Copolymer Using Olefin Polymerization Catalyst Containing Compound of Chemical Formula B3

An ethylene/1-octene copolymer was obtained in the same manner as in Preparation Example 4, except that the compound of Chemical Formula B3 was used as the transition metal compound.

<Comparative Example> Synthesis of Ethylene/1-Octene Copolymer Using Olefin Polymerization Catalyst Containing dimethylsilylene(t-butylamido)(indenyl)titanium dimethyl An ethylene/1-octene copolymer was obtained in the same manner as in Preparation Example 4, except that dimethylsilylene(t-butylamido)(indenyl)titanium dimethyl, which may be represented by the following Chemical Formula D, was used as the transition metal compound.

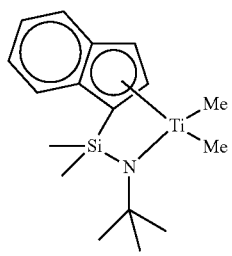

<Chemical Formula D>

<Experimental Example> Physical Property Measurement of Ethylene/1-Octene Copolymers The physical properties of the ethylene/1-octene copolymers prepared according to Preparation Examples 4 to 6 and the Comparative Example were measured, and the results are shown in Table 1 below.

TABLE 1

| Copolymer | Polymer weight (g) | Density (g/cm$^3$) | Molecular weight (Mw) | Melting point (° C.) | Catalyst activity (kg/mmol · h) |
| --- | --- | --- | --- | --- | --- |
| Preparation Example 4 | 35.2 | 0.897 | 349,174 | 79.93 | 106 |
| Preparation Example 5 | 32.8 | 0.907 | 544,861 | 94.79 | 98 |
| Preparation Example 6 | 30.0 | 0.906 | 483,269 | 89.48 | 90 |
| Comparative Example | 25.2 | 0.909 | 203,287 | 98.15 | 76 |

As shown in Table 1, the olefin polymers prepared using an olefin polymerization catalyst of the present invention containing the compound of Chemical Formula A3 or the compound of Chemical Formula B3 exhibited significantly superior physical properties in terms of density, molecular weight, melting point, and catalyst activity compared to the olefin polymer prepared in the Comparative Example.

In addition, even in the case where the mixture of the compound of Chemical Formula A3 and the compound of Chemical Formula B3, which was obtained by the process of preparing the transition metal compounds of Chemical Formulas A3 and B3 that includes a ligand synthesis step in which the synthesis of the ligand of Chemical Formula A3 was not carried out separately from the synthesis of the ligand of Chemical Formula B3, was used (Preparation Example 5), an olefin polymer exhibiting significantly superior physical properties compared to the olefin polymer prepared in the Comparative Example was obtained, and some physical properties (molecular weight and catalyst activity) of the obtained olefin polymer were even superior to those of the olefin polymer prepared in Preparation Example 4 or the olefin polymer prepared in Preparation Example 6.

Through the above-described experiment, it was found that a polyolefin having excellent properties in terms of low density, high molecular weight, and high activity can be prepared using the olefin polymerization catalyst of the present invention and that the mixture of transition metal compounds can be used as is without further separation, leading to lower production costs for a given level of polymerization performance.

While the embodiments within the scope of the inventive concept have been described in detail with reference to the above-exemplified chemical structural formulas, preparation examples, and the like, it should be understood that the inventive concept is not limited by, but can be variously modified based on, the exemplified chemical structural formulas, preparation examples, and the like. The exemplified chemical structural formulas, preparation examples, and the like have been provided to fully convey the scope of the inventive concept to those skilled in the art, and the scope of the inventive concept will only be defined by the scope of the claims. Therefore, it is to be understood that the above-described embodiments are illustrative in all aspects and are not restrictive.

The invention claimed is:

1. An olefin polymerization catalyst comprising:
  a main catalyst compound including one or more of a compound represented by the following Chemical Formula A2; and
  a co-catalyst compound,

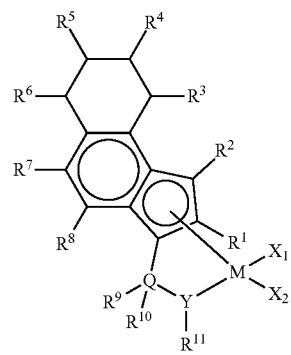

<Chemical Formula A2>

M is Ti, Q is Si, Y is N, $X_1$ and $X_2$ are each independently a halogen or a $C_{1-20}$ alkyl, $R^1$ and $R^9$ to $R^{11}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ are each a hydrogen atom.

2. The olefin polymerization catalyst of claim 1, wherein the co-catalyst compound includes one or more of a compound represented by the following Chemical Formula 1, a compound represented by the following Chemical Formula 2, and a compound represented by the following Chemical Formula 3:

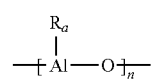

<Chemical Formula 1> in Chemical Formula 1, n is an integer of 2 or more, and $R_a$ is a hydrogen atom, a halogen radical, a $C_{1-20}$ hydrocarbyl radical, or a $C_{1-20}$ hydrocarbyl radical substituted with a halogen,

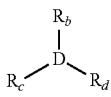

<Chemical Formula 2> in Chemical Formula 2,
D is aluminum (Al) or boron (B), and
$R_b$, $R_c$, and $R_d$ are each independently a halogen radical, a $C_{1-20}$ hydrocarbyl radical, or a $C_{1-20}$ hydrocarbyl radical substituted with a halogen, $[L-H]^+[Z(A)_4]^-$ or $[L]^+[Z(A)_4]^-$   <Chemical Formula 3>

In Chemical Formula 3,
L is a neutral or cationic Lewis base,
$[L-H]^+$ and $[L]^+$ are a Brønsted acid,
Z is a Group 13 element, and
A is each independently a $C_{6-20}$ aryl or a $C_{1-20}$ alkyl in which one or more hydrogen atoms have been substituted with a halogen radical, a $C_{1-20}$ hydrocarbyl radical, a $C_{1-20}$ alkoxy radical, or a $C_{6-20}$ aryloxy radical or have not been substituted.

3. A transition metal compound for an olefin polymerization catalyst, the transition metal compound represented by the following Chemical Formula A2:

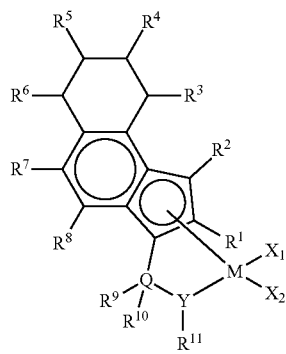

<Chemical Formula A2>

In Chemical Formula A2,

M is Ti, Q is Si, Y is N, $X_1$ and $X_2$ are each independently a halogen or a $C_{1-20}$ alkyl, $R^1$ and $R^9$ to $R^{11}$ are each independently a hydrogen atom, a substituted or unsubstituted $C_{1-20}$ alkyl, a substituted or unsubstituted $C_{2-20}$ alkenyl, a substituted or unsubstituted $C_{6-20}$ aryl, a substituted or unsubstituted $C_{1-20}$ alkyl $C_{6-20}$ aryl, a substituted or unsubstituted $C_{6-20}$ aryl $C_{1-20}$ alkyl, a substituted or unsubstituted $C_{1-20}$ heteroalkyl, a substituted or unsubstituted $C_{3-20}$ heteroaryl, or a substituted or unsubstituted $C_{1-20}$ silyl, and $R^2$ to $R^8$ are each a hydrogen atom.

4. A transition metal compound for an olefin polymerization catalyst, the transition metal compound represented by the following Chemical Formula a-7:

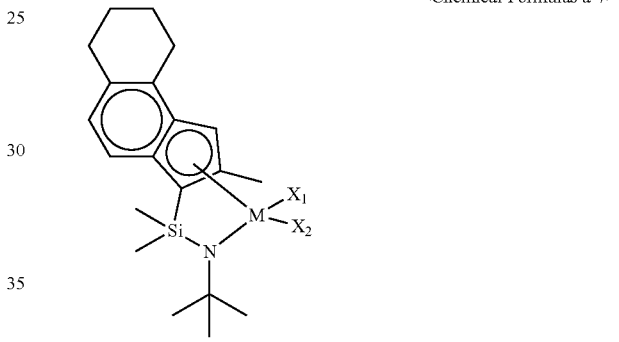

<Chemical Formulas a-7>

In Chemical Formula a-7, M is Ti, and $X_1$ and $X_2$ are each independently a halogen or a $C_{1-20}$ alkyl.

* * * * *